US007522172B2

(12) United States Patent
Tanase et al.

(10) Patent No.: US 7,522,172 B2
(45) Date of Patent: Apr. 21, 2009

(54) DISPLAY DEVICE

(75) Inventors: Susumu Tanase, Kadoma (JP); Atsuhiro Yamashita, Osaka (JP); Yukio Mori, Hirakata (JP); Haruhiko Murata, Ibaraki (JP); Koji Marumo, Gifu (JP); Kazunobu Mameno, Kyoto (JP)

(73) Assignee: Sanyo Electric Co., Ltd., Moriguchi, Osaka (JP)

( * ) Notice: Subject to any disclaimer, the term of this patent is extended or adjusted under 35 U.S.C. 154(b) by 328 days.

(21) Appl. No.: 11/439,207

(22) Filed: May 24, 2006

(65) Prior Publication Data

US 2006/0268003 A1 Nov. 30, 2006

(30) Foreign Application Priority Data

May 25, 2005 (JP) ............................ 2005-152058

(51) Int. Cl.
*G06T 15/00* (2006.01)

(52) U.S. Cl. ....................... 345/603; 345/600; 345/694; 348/222.1; 347/13; 347/19; 347/42

(58) Field of Classification Search ................. 345/419, 345/619, 629, 600, 603, 694, 82; 348/222.1; 347/5, 13, 19, 42, 43
See application file for complete search history.

(56) References Cited

U.S. PATENT DOCUMENTS 5,929,843 A * 7/1999 Tanioka ...................... 345/600

FOREIGN PATENT DOCUMENTS

JP 2001-109423 4/2001
JP 2002-189440 5/2002

OTHER PUBLICATIONS

Stoofel et al., A Survey of Electronic Technique for Pictorial Image Production, IEEE, Transaction on Communication, 1981, pp. 1898-1925.*

* cited by examiner

*Primary Examiner*—Phu K Nguyen
(74) *Attorney, Agent, or Firm*—NDQ&M Watchstone LLP; Vincent M. DeLuca

(57) ABSTRACT

A display device has: an RGB-RGBW conversion circuit that converts RGB signals fed thereto into RGBW signals; a display panel that has a plurality of dots each composed of four, namely R, G, B, and W, unit pixels and that displays an image based on the RGBW signals; a defect position specifier that specifies, if a unit pixel is found defective, a position of the defective pixel on the display panel; and a conversion rate controller that controls the rate at which, when the RGB signals are converted into the RGBW signals, the RGB signals are converted into a W signal according to the position of the defective pixel. If the defective pixel is a W pixel, the conversion rate for pixels adjacent thereto is made lower than the standard conversion rate set for the entire display panel.

18 Claims, 14 Drawing Sheets

FIG.10

| | $W_5$ | $R_5$ | $B_5$ | $G_5$ | $W_6$ | $R_6$ | $B_6$ | $G_6$ | $W_7$ |
|---|---|---|---|---|---|---|---|---|---|
| | 100% | 75% | 50% | 25% | — | 25% | 50% | 75% | 100% |
| W | (115) | 86 | 57 | 28 | — | 28 | 57 | 86 | (115) |
| R | 105 | (134) | 163 | 192 | — | (192) | 163 | 134 | 105 |
| G | 85 | 109 | 133 | (157) | — | 157 | 133 | (109) | 85 |
| B | 0 | 26 | (51) | 76 | — | 76 | (51) | 26 | 0 |

FIG.11

| | $W_5$ | $R_5$ | $B_5$ | $G_5$ | $W_6$ | $R_6$ | $B_6$ | $G_6$ | $W_7$ |
|---|---|---|---|---|---|---|---|---|---|
| | 100% | 100% | 100% | 100% | — | 100% | 100% | 100% | 100% |
| W | (115) | 115 | 115 | 115 | — | 115 | 115 | 115 | (115) |
| R | 105 | (105) | 105 | 105 | — | (105) | 105 | 105 | 105 |
| G | 85 | 85 | 85 | (85) | — | 85 | 85 | (85) | 85 |
| B | 0 | 0 | (0) | 0 | — | 0 | (0) | 0 | 0 |

FIG.19

| | | | | | | | | |
|---|---|---|---|---|---|---|---|---|
| $W_{11}$ | $R_{11}$ | $B_{11}$ | $G_{11}$ | $W_{12}$ | $R_{12}$ | $B_{12}$ | $G_{12}$ | W |
| 90 | 90 | 90 | 90 | 100 | 90 | 90 | 90 | 90 |
| $W_{13}$ | $R_{13}$ | $B_{13}$ | $G_{13}$ | $W_{14}$ | $R_{14}$ | $B_{14}$ | $G_{14}$ | W |
| 90 | 90 | 90 | 90 | | 90 | 90 | 90 | 90 |
| $W_{15}$ | $R_{15}$ | $B_{15}$ | $G_{15}$ | $W_{16}$ | $R_{16}$ | $B_{16}$ | $G_{16}$ | W |
| 90 | 90 | 90 | 90 | 100 | 90 | 90 | 90 | 90 |

FIG.20

| | | | | | | | | |
|---|---|---|---|---|---|---|---|---|
| $W_{11}$ | $R_{11}$ | $B_{11}$ | $G_{11}$ | $W_{12}$ | $R_{12}$ | $B_{12}$ | $G_{12}$ | W |
| 90 | 90 | 90 | 90 | 90 | 90 | 90 | 90 | 90 |
| $W_{13}$ | $R_{13}$ | $B_{13}$ | $G_{13}$ | $W_{14}$ | $R_{14}$ | $B_{14}$ | $G_{14}$ | W |
| 90 | 90 | 90 | 80 | | 80 | 90 | 90 | 90 |
| $W_{15}$ | $R_{15}$ | $B_{15}$ | $G_{15}$ | $W_{16}$ | $R_{16}$ | $B_{16}$ | $G_{16}$ | W |
| 90 | 90 | 90 | 90 | 90 | 90 | 90 | 90 | 90 |

FIG.21

| | | | | | | | | |
|---|---|---|---|---|---|---|---|---|
| $W_{11}$ | $R_{11}$ | $B_{11}$ | $G_{11}$ | $W_{12}$ | $R_{12}$ | $B_{12}$ | $G_{12}$ | W |
| 100 | 100 | 100 | 90 | 100 | 90 | 100 | 100 | 100 |
| $W_{13}$ | $R_{13}$ | $B_{13}$ | $G_{13}$ | $W_{14}$ | $R_{14}$ | $B_{14}$ | $G_{14}$ | W |
| 100 | 100 | 50 | 20 | | 20 | 50 | 100 | 100 |
| $W_{15}$ | $R_{15}$ | $B_{15}$ | $G_{15}$ | $W_{16}$ | $R_{16}$ | $B_{16}$ | $G_{16}$ | W |
| 100 | 100 | 100 | 90 | 100 | 90 | 100 | 100 | 100 |

DISPLAY DEVICE

This application is based on Japanese Patent Application No. 2005-152058 filed on May 25, 2005, the contents of which are hereby incorporated by reference.

BACKGROUND OF THE INVENTION

1. Field of the Invention

The present invention relates to a display device such as an organic EL (electroluminescence) display device, inorganic EL display device, liquid crystal display device, or plasma display device.

2. Description of Related Art

Display devices like an organic EL display device provided with a self-luminous display panel (self-luminous display) offer advantages of being slim, lightweight, and low-power-consumption, and have been finding increasingly wide application. For application in cellular phones, digital still cameras, and the like, however, such display devices are still to attain lower power consumption.

There have been developed RGB-type organic EL display devices having R, G, and B color filters bonded to a white light emitting material. An RGB-type organic EL display device includes, for each of its R, G, and B unit pixels, an organic EL element. In an RGB-type organic EL display device, when light passes through the color filters, part of the light is absorbed by the color filters. This results in poor light use efficiency, hampering further lowering of power consumption.

Under these circumstances, the applicant of the present application has developed, and has filed patent applications for, RGBW-type organic EL display devices (self-luminous display devices) that permit further lowering of power consumption. An RGBW-type organic EL display device includes, for each of its R, G, B, and W unit pixels, an organic EL element. These organic EL elements emits, for example, white light.

An RGBW-type organic EL display device includes a display panel composed of, as shown in FIG. 24, an array of a large number of dots, each composed of four, namely R, G, B, and W unit pixels. Three of these four unit pixels have color filters of three primary colors, for example, R (red), G (green), and B (blue), arranged thereat; the fourth unit pixel has no color filter arranged thereat to serve to display white (W).

Having no color filter arranged thereat, the unit pixel for displaying white exhibits extremely high light use efficiency. Accordingly, for example, when white is displayed, it is displayed not by making the unit pixels for displaying R, G, and B emit light but by making the unit pixel for displaying white emit light. This helps greatly reduce power consumption.

If the RGB-signals-to-W-signal conversion rate (the proportion in which RGB signals are converted into a W signal) is 100%, as much of the RGB signals as possible is converted into the W signal, and thus the high-efficiency W pixels (the pixels for displaying white) are made the most of, achieving the lowest power consumption. In a case where RGB signals are each an eight-bit digital signal, and when they all have a value of 255 (assuming that an increase in this value means an increase in brightness), if the RGB-signals-to-W-signal conversion rate is 100%, for example, as shown in FIG. 25, the RGB pixels emit no light at all, and instead the W pixels alone emit light at their maximum level, thereby displaying white.

JP-A-2001-109423 (hereinafter "Patent Publication 1") discloses an RGB-type display device provided with means for controlling the signals applied to adjacent pixels such that the sum of the brightness of the pixels adjacent to a defective pixel equals the brightness that the defective pixel would produce were it not defective.

JP-A-2002-189440 (hereinafter "Patent Publication 2") discloses an RGB-type display device provided with: a correction data storage portion that stores correction data prescribed according to input signals; and a correction processing portion that, when a defective pixel is found, determines correction data based on input signals and, by using the correction data, corrects the input signals to the pixels around the defective pixel.

Usually, the RGB-signals-to-W-signal conversion rate is set equal (for example, 100%) over the entire the display panel. From the viewpoint of reducing power consumption, it is preferable that the RGB-signals-to-W-signal conversion rate be set as high as possible. If there is a defect among W pixels for displaying white, however, as shown in FIG. 26, when white is displayed, the defect appears as a very conspicuous black spot (indicated by numeral 50 in FIG. 26). This not only degrades the display quality of the display panel, but also increases the incidence of defective panels, leading to a low yield.

The technologies disclosed in Patent Publications 1 and 2 mentioned above are aimed at simply increasing the brightness of pixels around a faulty (defective) pixel, if any, in an RGB-type display device, and therefore cannot be applied, as they are, to an RGBW-type display device where consideration needs to be given to, among other factors, the RGB-signals-to-W-signal conversion rate. Incidentally, in an RGB-type display device, even if a pixel is defective, when white is displayed, it is only a single R, G, or B pixel that fails to emit light. Thus, with no black spot appearing, the defect is comparatively inconspicuous.

SUMMARY OF THE INVENTION

In view of the conventionally experienced inconveniences mentioned above, it is an object of the present invention to provide a display device in which a defective pixel, if any, is less conspicuous than ever.

To achieve the above object, according to the present invention, a display device is provided with: an RGB-RGBX conversion circuit that converts RGB signals fed thereto into RGBX signals, where X represents a predetermined color other than R, G, and B; a display panel that displays an image based on the RGBX signals obtained from the RGB-RGBX conversion circuit, the display panel being composed of a plurality of dots each composed of four unit pixels that are an R pixel, a G pixel, a B pixel, and an X pixel; and a defect position specifier that specifies, if a unit pixel is found defective, the position of the defective pixel on the display panel. Here, the RGB-RGBX conversion circuit has a conversion rate controller that controls the conversion rate at which, when the RGB signals are converted into the RGBX signals, the RGB signals are converted into an X signal according to the position specified by the defect position specifier. The conversion rate controller makes the conversion rate for at least one unit pixel adjacent to the defective pixel different from the standard conversion rate set for the entire display panel.

Consider, for example, a case where an X pixel, which would emit white light if not defective, is defective and does not emit light as expected. In this case, if RGB signals are converted into an X signal on the assumption that the defective X pixel emits light as expected, then, as in the display panel 60 shown in FIG. 27A, when white is displayed, the defective pixel appears as a conspicuous black spot.

In the configuration described above, however, the conversion rate for at least one unit pixel adjacent to the defective pixel is so controlled as to be different from the standard conversion rate (for example, 90% or 100%) set for the entire display panel. That is, according to the type of the unit pixel found defective, as in the display panel 61 shown in FIG. 27B, the conversion rate can be so controlled as to make the defective pixel inconspicuous.

Specifically, suppose that the RGB signals fed to the RGB-RGBX conversion circuit are composed of an R signal representing the brightness of R pixels, a G signal representing the brightness of G pixels, and a B signal representing the brightness of B pixels; moreover, let the maximum value of the X signal obtained when the RGB signals fed to the RGB-RGBX conversion circuit are converted into the RGBX signals be called the maximum-conversion X signal value, and let the component of the R signal, the component of the G signal, and the component of the B signal that are to be converted into the maximum-conversion X signal value be called the maximum-conversion R signal, the maximum-conversion G signal, and the maximum-conversion B signal, respectively; then the conversion rate controlled by the conversion rate controller represents the ratio of the component of the R signal actually converted into the X signal to the maximum-conversion R signal, the ratio of the component of the G signal actually converted into the X signal to the maximum-conversion G signal, and the ratio of the component of the B signal actually converted into the X signal to the maximum-conversion B signal.

In Numerical Example 3 (FIG. 5), which is one of the embodiments described later, the maximum-conversion X signal value corresponds to $W_{MAX}$=115, and the component of the R signal, the component of the G signal, and the component of the B signal that are to be converted into that maximum-conversion X signal value are 115 (=115/1.00), 95 (=115/1.20), and 100 (=115/1.15), respectively (see also FIG. 4). For example, when the component of the R signal that is actually converted into the X signal is 80 (see graph P11 in FIG. 5), the ratio of the component of the R signal to the maximum-conversion R signal, that is, the conversion rate, is 0.7 (=80/115).

For example, the chromaticity coordinates of the chromaticity obtained as a result of light emission by an X pixel are located, in the chromaticity coordinate system, inside the triangle formed by the chromaticity coordinates of an R pixel, the chromaticity coordinates of a G pixel, and the chromaticity coordinates of a B pixel.

For example, the standard conversion rate is the conversion rate set for all the unit pixels when none of all the unit pixels forming the display panel is found defective.

Specifically, a defective pixel is made inconspicuous by one of the following ways.

For example, if the defective pixel is an X pixel, the conversion rate controller makes the conversion rate for at least one non-X unit pixel adjacent to the defective pixel lower than the standard conversion rate.

In FIG. 12, which shows one of the embodiments described later, the defective pixel corresponds to $W_6$, and the non-X unit pixels adjacent to the defective pixel correspond to $G_5$, $R_6$, $B_2$, and $B_9$.

Alternatively, for example, if the defective pixel is an X pixel, the conversion rate controller makes the conversion rate for the R, G, and B pixels of a dot including at least one unit pixel adjacent to the defective pixel lower than the standard conversion rate.

In FIG. 14, which shows one of the embodiments described later, the defective pixel corresponds to $W_6$, and the dots including the unit pixels adjacent to the defective pixel correspond to D2, D5, D7, and D9 (see also FIG. 7).

Alternatively, for example, if the defective pixel is an R, G, or B pixel, the conversion rate controller makes the conversion rate for at least one non-X unit pixel adjacent to the defective pixel lower than the standard conversion rate.

In FIG. 15, which shows one of the embodiments described later, the defective pixel corresponds to $B_6$, and the non-X unit pixels adjacent to the defective pixel correspond to $R_6$ and $G_6$.

Alternatively, for example, if the defective pixel is an R, G, or B pixel, and in addition one or more X pixels are adjacent to the defective pixel, the conversion rate controller makes the conversion rate for at least one of the one or more X pixels adjacent to the defective pixel higher than the standard conversion rate.

In FIG. 16, which shows one of the embodiments described later, the defective pixel corresponds to $B_6$, and the X unit pixels adjacent to the defective pixel correspond to $W_3$ and $W_{10}$.

Alternatively, for example, if the defective pixel is an X pixel, and in addition one or more other X pixels are adjacent to the defective pixel, the conversion rate controller makes the conversion rate for at least one X pixel adjacent to the defective pixel higher than the standard conversion rate.

In FIG. 19, which shows one of the embodiments described later, the defective pixel corresponds to $W_{14}$, and the X unit pixels adjacent to the defective pixel correspond to $W_{12}$ and $W_{16}$.

Alternatively, for example, if the defective pixel is an X pixel, and in addition one or more other X pixels are adjacent to the defective pixel, the conversion rate controller makes the conversion rate for at least one non-X unit pixel adjacent to the defective pixel lower than the standard conversion rate.

In FIG. 20, which shows one of the embodiments described later, the defective pixel corresponds to $W_{14}$, and the non-X unit pixels adjacent to the defective pixel correspond to $G_{13}$ and $R_{14}$.

Alternatively, for example, if the defective pixel is an X pixel, in addition one or more other X pixels are adjacent to the defective pixel, and in addition the conversion rate for the other X pixels adjacent to the defective pixel is maximal, the conversion rate controller makes the conversion rate for at least one non-X unit pixel adjacent to the defective pixel lower than the standard conversion rate, and makes the conversion rate for at least one non-X unit pixel adjacent to the other X pixels lower than the standard conversion rate.

In FIG. 21, which shows one of the embodiments described later, the defective pixel corresponds to $W_{14}$, and the other X unit pixels adjacent to the defective pixel correspond to $W_{12}$ and $W_{16}$. The non-X unit pixels adjacent to the defective pixel correspond to $G_{13}$ and $R_{14}$, and the non-X unit pixels adjacent to the other X unit pixels correspond to $G_{11}$, $R_{12}$, $G_{15}$, and $R_{16}$.

As described above, with a display device according to the present invention, a defective pixel can be made inconspicuous. This helps alleviate degradation in the display quality of the display pixel, and helps reduce the incidence of defective panels.

BRIEF DESCRIPTION OF THE DRAWINGS

FIG. 10 is a diagram illustrating the above example of setting (the first example of setting);

FIG. 11 is a diagram illustrating the above example of setting (the first example of setting);

FIG. 19 is a diagram illustrating an example of how the W pixel use rate is set (a sixth example of setting) in the second embodiment;

FIG. 20 is a diagram illustrating an example of how the W pixel use rate is set (a seventh example of setting) in the second embodiment;

FIG. 21 is a diagram illustrating an example of how the W pixel use rate is set (an eighth example of setting) in the second embodiment;

DETAILED DESCRIPTION OF PREFERRED EMBODIMENTS

First Embodiment

Figure 1:
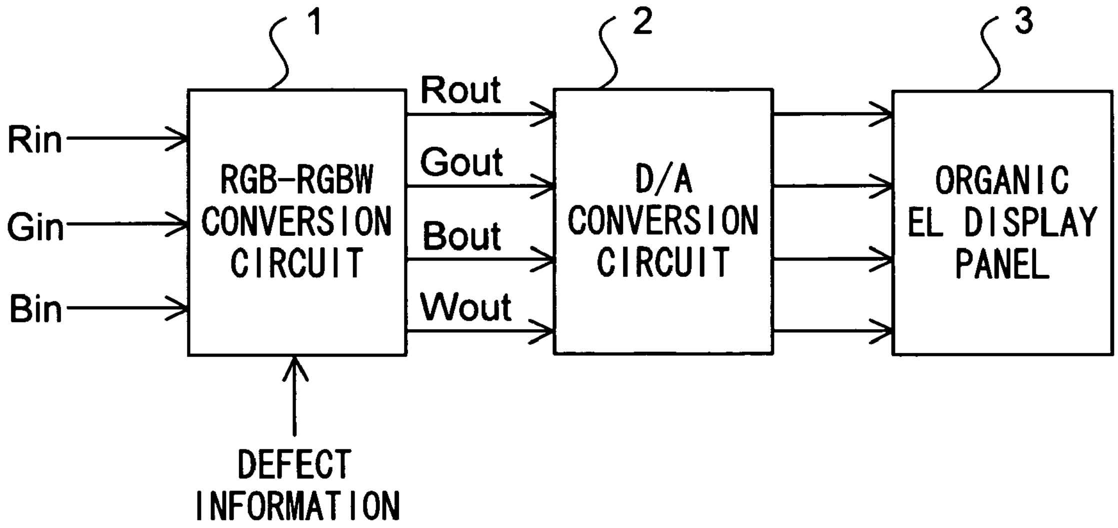
FIG. 1 is a block diagram showing the overall configuration of an organic EL display device of a first embodiment of the present invention.

A first embodiment of the present invention will be described in detail below with reference to the accompanying drawings. FIG. 1 shows the configuration of an organic EL (electroluminescence) display device of the first embodiment of the present invention. As shown in FIG. 1, the organic EL display device of the first embodiment includes an RGB-RGBW conversion circuit 1, a D/A conversion circuit 2, and an organic EL display panel 3 (hereinafter referred to simply as the "display panel 3"). The organic EL display device of this embodiment further includes a defect position specifier 15 and other components (see FIG. 6), which are omitted from illustration in FIG. 1.

From outside, digital RGB signals Rin, Gin, and Bin are fed to the RGB-RGBW conversion circuit 1. In the following description, these RGB signals Rin, Gin, and Bin are also referred to simply as the "RGB input signals". Based on pixel defect information fed from the defect position specifier 15 (see FIG. 6), the RGB-RGBW conversion circuit 1 converts the RGB input signals into digital RGBW signals Rout, Gout, Bout, and Wout. How the RGB-RGBW conversion circuit 1 operates based on pixel defect information will be described in detail later. In the following description, the RGBW signals Rout, Gout, Bout, and Wout are also referred to simply as the "RGBW signals".

The RGBW signals obtained from the RGB-RGBW conversion circuit 1 are converted into analog RGBW signals by the D/A conversion circuit 2. The display panel 3 is an RGBW-type display panel that displays a color image based on the analog RGBW signals obtained from the D/A conversion circuit 2.

Figure 2:
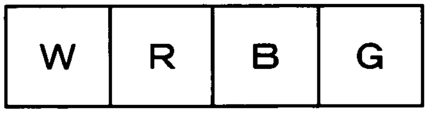
FIG. 2 is a diagram showing the configuration of each of the dots arrayed in the display panel (organic EL display panel) shown in FIG. 1.

To display a color image, the display panel 3 has a plurality of dots arrayed in rows and columns. FIG. 2 shows the configuration of each dot. Each dot is composed of an R (red) pixel, a G (green) pixel, a B (blue) pixel, and W (white) pixel. Whereas the R, G, and B pixels have an R color filter, a G color filter, and a B color filter (none of these is unillustrated) bonded to a white light emitting material, the W pixel has no color filter bonded to a white light emitting material. In this way, each dot is composed of four unit pixels, namely an R, a G, a B, and a W pixel.

In the following description, R, G, and B pixels are also referred to collectively as "RGB pixels", and likewise R, G, B, and W pixels are also referred to collectively as "RGBW pixels".

The RGB input signals fed to the RGB-RGBW conversion circuit 1 are composed of an R signal Rin representing the R (red) component of the image, a G signal Gin representing the G (green) component of the image, and an B signal Bin representing the B (blue) component of the image. In a case where the image is displayed with RGB pixels (three unit pixels, namely R, G, and B pixels), that is, when the image is displayed on an RGB basis, the R, G, and B signals Rin, Gin, and Bin represent the brightness of R, G, and B pixels, respectively.

The RGBW signals outputted from the RGB-RGBW conversion circuit 1 are composed of an R signal Rout, a G signal Gout, a B signal Bout, and a W signal Wout. In a case where the image is displayed with RGBW pixels (four unit pixels, namely R, G, B, and W pixels), that is, when the image is displayed on an RGBW basis, the R, G, B, and W signals Rout, Gout, Bout, and Wout represent the brightness of R, G, B, and W pixels, respectively.

The RGB signals Rin, Gin, and Bin (the R, G, and B signals Rin, Gin, and Bin) are each an eight-bit digital signal (needless to say, these may each be other than an eight-bit digital signal) that takes a value between 0 and 255, an increase in this value meaning an increase in the brightness of the corresponding unit pixel. Likewise, the RGBW signals Rout, Gout, Bout, and Wout (the R, G, B, and W signals Rout, Gout, Bout, and Wout) are each an eight-bit digital signal (needless to say, these may each be other than an eight-bit digital signal) that takes a value between 0 and 255, an increase in this value meaning an increase in the brightness of the corresponding unit pixel. In the following description, for the sake of simplicity, the signal values (that is, the values of the RGB input signals and the values of the RGBW signals) are proportional to display brightness.

Principle of Conversion

Now, the principle on which the RGB-RGBW conversion circuit 1 converts RGB input signals to RGBW signals will be described by way of a first, a second, and a third numerical examples. The principle of conversion described below applies not only to this embodiment but to the second embodiment described later.

First, as a first numerical example, consider a case where RGB input signals are converted into a W signal in a ratio of 1:1:1, that is, where RGB input signals (Rin, Gin, Bin)=(k, k, k) are converted into a W signal having a value of k (that is, Wout=k), where k is an integer between 0 to 255.

Figure 3:
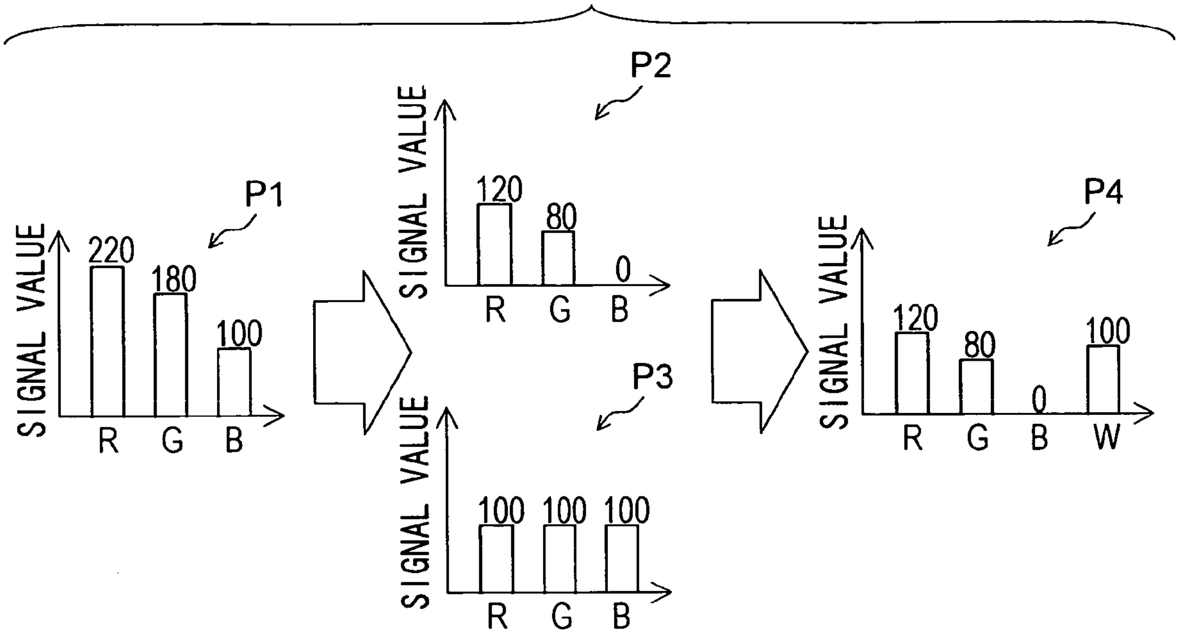
FIG. 3 is a diagram illustrating the principle on which the RGB-RGBW conversion circuit shown in FIG. 1 converts RGB input signals to RGBW signals.

FIG. 3 is a diagram showing the conversion into RGBW signals in the first numerical example. Suppose now that, as shown in graph P1 in FIG. 3, (Rin, Gin, Bin)=(220, 180, 100), that is, Rin=220, Gin=180, and Bin=100. Since 220−100=120, 180−100=80, and 100−100=0, these RGB signals can be broken down into first RGB signal components (120, 80, 0) shown in graph P2 and second RGB signal components (100, 100, 100) shown in graph P3.

Since the ratio in which RGB input signals are converted into a W signal is 1:1:1, the second RGB signal components (100, 100, 100) are converted into a W signal having a value of 100. Adding up (synthesizing) the W signal having a value of 100 and the first RGB signal components shown in graph P2 produces RGBW signal values (120, 80, 0, 100) shown in graph P4. That is, in the first numerical example, RGB input signals are converted into RGBW signals such that (Rout, Gout, Bout, Wout)=(120, 80, 0, 100).

The first numerical example has just been described assuming that the ratio in which RGB input signals are converted into a W signal is 1:1:1. In reality, however, the chromaticity of the white obtained from a white self-luminous material (organic EL elements) is often different from the chromaticity of the targeted white. When RGB input signals (Rin, Gin, Bin)=(k, k, k) are fed in, the chromaticity of the targeted white should be realized. To achieve this, according to the characteristics of the display panel, the ratio in which RGB input signals are converted into a W signal need to be set adequately. How the ratio is calculated according to the characteristics of the display panel will be described later in the section headed "Panel Adjustment".

Next, as a second numerical example, consider a case where RGB input signals are converted into a W signal in a ratio of 1.00:1.20:1.15, that is, where RGB input signals (Rin, Gin, Bin)=(k/1.00, k/1.20, k/1.15) are converted into a W signal having a value of k, where k is an integer between 0 to 255.

Figure 4:
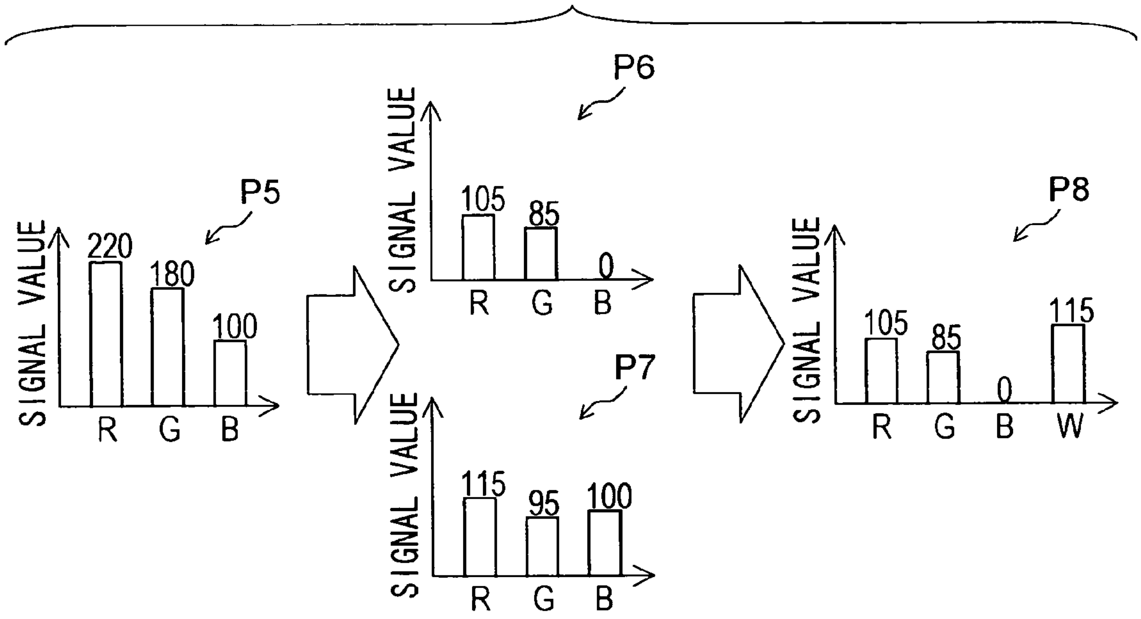
FIG. 4 is a diagram illustrating the above principle of conversion.

FIG. 4 is a diagram showing the conversion into RGBW signals in the second numerical example. Suppose now that, as shown in graph P5 in FIG. 4, (Rin, Gin, Bin)=(220, 180, 100). First, the maximum value of the W signal that can be obtained as a result of the RGB input signals being converted into RGBW signals (this value will hereinafter be referred to as the "maximum-conversion W signal value $W_{MAX}$") is calculated. The maximum-conversion W signal value $W_{MAX}$ corresponds to the minimum value min(R1, G1, B1) among the values R1, G1, and B1 calculated by formulae (1), (2), and (3) noted below, and thus equals 115. In the second numerical example, this value of 115 is, as it is, used as the W signal Wout.

Here, "min(z1, z2, z3)" (where z1, z2, and z3 are arbitrary numbers) is an operational notation that denotes taking the minimum value among z1, z2, and z3. In the following description, except when the ratio in which RGB input signals are converted into a W signal and the maximum-conversion W signal value $W_{MAX}$ are dealt with, all values will be considered (in principle) with their fractional portions discarded.

$$R1=220\times1.00=220 \quad (1)$$

$$G1=180\times1.20=216 \quad (2)$$

$$B1=100\times1.15=115 \quad (3)$$

Subsequently, to calculate the RGB signals as they are after conversion into RGBW signals (that is, to calculate Rout, Gout, and Bout), the component R2 of the R signal Rin, the component G2 of the G signal Gin, and the component B2 of the B signal Bin that are converted into Wout are calculated by formulae (4), (5), and (6) below.

$$R2=115/1.00=115 \quad (4)$$

$$G2=115/1.20=95 \quad (5)$$

$$B2=115/1.15=100 \quad (6)$$

Since 220−115=105, 180−95=85, and 100−100=0, the RGB input signals can be broken down into first RGB signal components (105, 85, 0) shown in graph P6 and second RGB signal components (115, 95, 100) shown in graph P7.

Since the ratio in which RGB input signals are converted into a W signal is 1.00:1.20:1.15, the second RGB signal components (115, 95, 100) are converted into a W signal having a value of 115. Adding up (synthesizing) the W signal having a value of 115 and the first RGB signal components shown in graph P6 produces RGBW signal values (105, 85, 0, 115) shown in graph P8. That is, in the second numerical example, RGB input signals are converted into RGBW signals such that (Rout, Gout, Bout, Wout)=(105, 85, 0, 115).

The second numerical example is an example where the maximum value of the W signal obtained as a result of RGB input signals being converted into RGBW signals (that is, the maximum-conversion W signal value $W_{MAX}$) is used, as it is, as the Wout (that is, an example where the W signal Wout is maximized), in other words, an example where the W pixel use rate (that is, the RGB-signals-to-W-signal conversion rate, or the W contribution rate) $W_{GAIN}$ is maximized, that is, made equal to 100%. As will be described in detail later, in the RGB-RGBW conversion circuit according to the present invention, the W pixel use rate (that is, the RGB-signals-to-W-signal conversion rate) $W_{GAIN}$ is varied as necessary.

Next, as a third numerical example, consider a case where RGB input signals are converted into a W signal in a ratio of 1.00:1.20:1.15 as in the second numerical example and in addition the W pixel use rate $W_{GAIN}$ is 70%.

Figure 5:
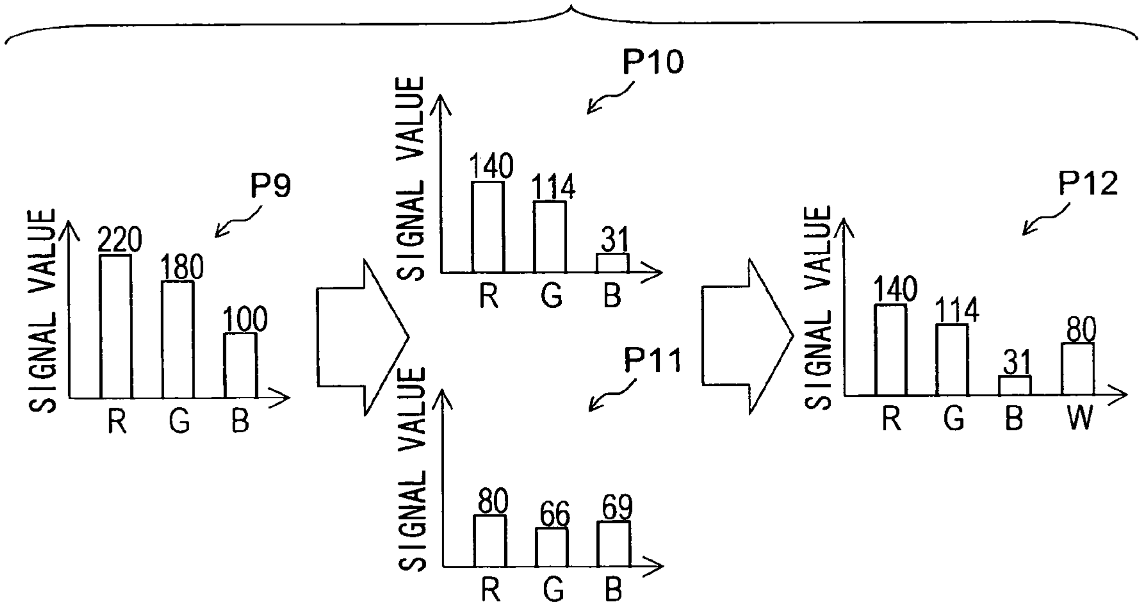
FIG. 5 is a diagram illustrating the above principle of conversion.

FIG. 5 is a diagram showing the conversion into RGBW signals in the third numerical example. Suppose now that, as shown in graph P9 in FIG. 5, (Rin, Gin, Bin)=(220, 180, 100). Since the values of the RGB input signals are the same as in the second numerical example, the maximum-conversion W signal value $W_{MAX}$ is calculated, by formulae (1) to (3) noted above, as 115. In the third numerical example, however, since the W pixel use rate $W_{GAIN}$ is 70%, Wout=115×0.7=80.

Subsequently, to calculate the RGB signals as they are after conversion into RGBW signals (that is, to calculate Rout, Gout, and Bout), the component R2 of the R signal Rin, the component G2 of the G signal Gin, and the component B2 of the B signal Bin that are converted into Wout are calculated by formulae (7), (8), and (9) below.

$$R2=80/1.00=80 \quad (7)$$

$$G2=80/1.20=66 \quad (8)$$

$$B2=80/1.15=69 \quad (9)$$

Since 220−80=140, 180−66=114, and 100−69=31, the RGB input signals can be broken down into first RGB signal components (140, 114, 31) shown in graph P10 and second RGB signal components (80, 66, 69) shown in graph P11.

Since the ratio in which RGB input signals are converted into a W signal is 1.00:1.20:1.15, the second RGB signal components (80, 66, 69) are converted into a W signal having a value of 80 (=115×0.7). Adding up (synthesizing) the W signal having a value of 80 and the first RGB signal components shown in graph P10 produces RGBW signal values (140, 114, 31, 80) shown in graph P12. That is, in the third numerical example, RGB input signals are converted into RGBW signals such that (Rout, Gout, Bout, Wout)=(140, 114, 31, 80).

Now, through a comparison between graph P7 shown in FIG. 4 in connection with the second numerical example described above and graph P11 shown in FIG. 5 in connection with the third numerical example described above, what the W pixel use rate (the RGB-signals-to-W-signal conversion rate) $W_{GAIN}$ means will be discussed. Let the component of the R signal Rin, the component of the G signal Gin, and the component of the B signal Bin that are to be converted into the maximum-conversion W signal value $W_{MAX}$ be called the maximum-conversion R signal, the maximum-conversion G signal, and the maximum-conversion B signal, respectively. Then, the maximum-conversion R signal, the maximum-conversion G signal, and the maximum-conversion B signal are (115, 95, 100) shown in graph P7 in FIG. 4.

In the third numerical example, the proportion (ratio) of the component of the R signal that is actually converted into the W signal (in the third numerical example, 80) to the maximum-conversion R signal (in the third numerical example, 115) is 80/115≈70%. This value is equal to the W pixel use rate $W_{GAIN}$ as set. The proportion (ratio) of the component of the G signal that is actually converted into the W signal (in the third numerical example, 66) to the maximum-conversion G signal (in the third numerical example, 95) is 66/95≈70% again. The proportion (ratio) of the component of the B signal that is actually converted into the W signal (in the third numerical example, 69) to the maximum-conversion B signal (in the third numerical example, 100) is 69/100≈70% again.

Thus, the W pixel use rate (the RGB-signals-to-W-signal conversion rate) $W_{GAIN}$ means the proportion (ratio) of the component of the R signal that is actually converted into the W signal to the maximum-conversion R signal, the proportion (ratio) of the component of the G signal that is actually converted into the W signal to the maximum-conversion G signal, and the proportion (ratio) of the component of the B signal that is actually converted into the W signal to the maximum-conversion B signal.

The RGB input signals (in the third numerical example, expressed as (Rin, Gin, Bin)=(220, 180, 100)) minus the RGB signals that are converted into the W signal (in the third numerical example, expressed as (R2, G2, B2)=(80, 66, 69)) leave the RGB signals as they are after conversion into the RGBW signals outputted from the RGB-RGBW conversion circuit 1 (in the third numerical example, expressed as (Rout, Gout, Bout)=(140, 114, 31)).

Detailed Configuration of the Display Device

Figure 6:
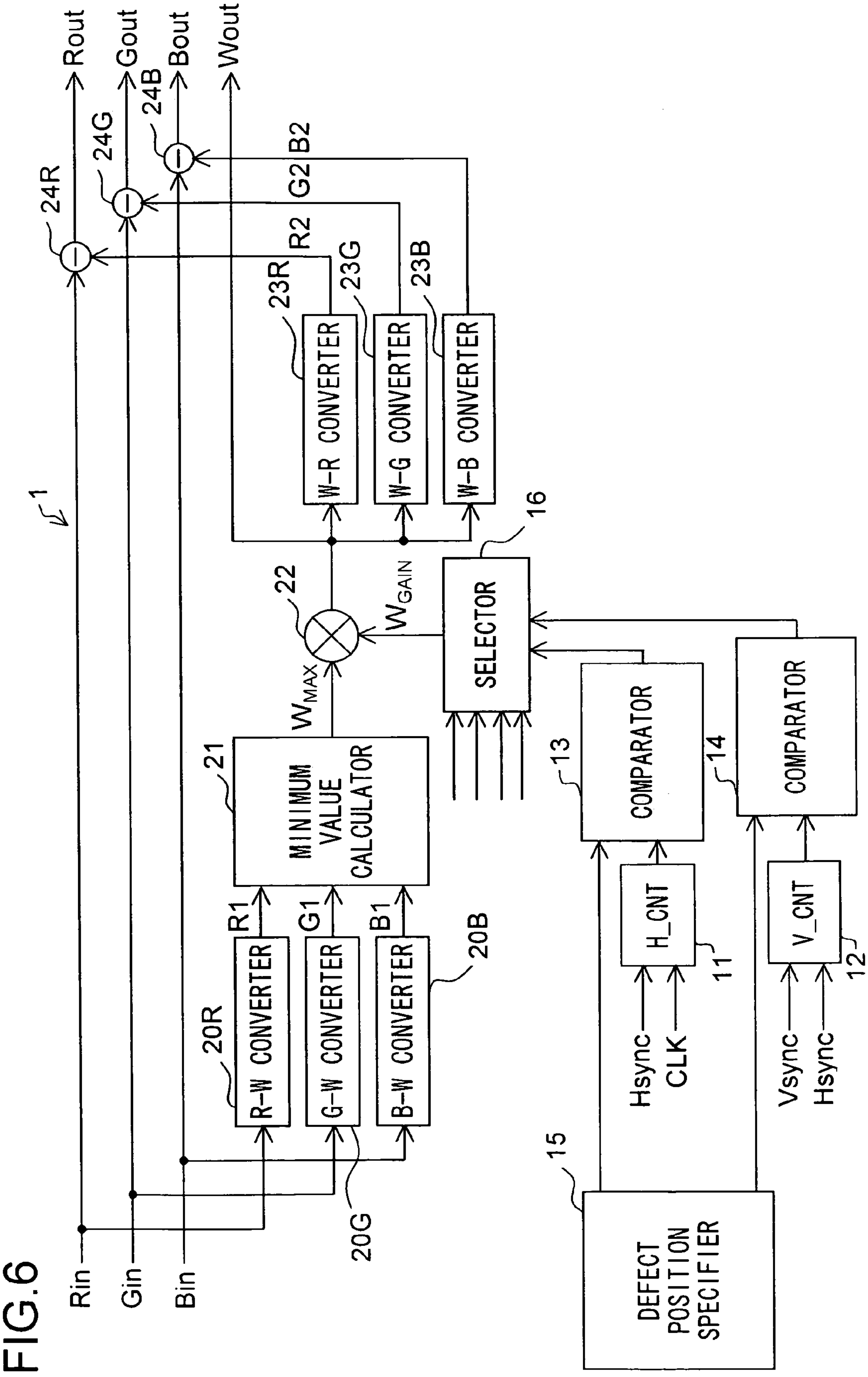
FIG. 6 is a diagram showing the configuration inside and around the RGB-RGBW conversion circuit shown in FIG. 1.

The RGB-RGBW conversion circuit 1 according to the present invention converts RGB input signals into RGBW signals while adequately controlling (adjusting) the above-mentioned W pixel use rate (the RGB-signals-to-W-signal conversion rate) $W_{GAIN}$ according to pixel defect information fed from the defect position specifier 15. FIG. 6 is a diagram showing the configuration inside and around the RGB-RGBW conversion circuit 1 shown in FIG. 1.

The RGB-RGBW conversion circuit 1 includes an R-W converter 20R, a G-W converter 20G, a B-W converter 20B, a minimum value calculator 21, a multiplier 22, a W-R converter 23R, a W-G converter 23G, a W-B converter 23B, subtracters 24R, 24G, and 24B, comparators 13 and 14, and a selector 16.

Based on the horizontal synchronizing signal Hsync of the RGB input signals Rin, Gin, and Bin, and based also on a dot signal (dot clock ) CLK, a horizontal counter (H_CNT) 11 outputs a horizontal position signal indicating the horizontal position on the screen (on the display panel 3, or 3*a* described later) corresponding to the RGB input signals Rin, Gin, and Bin. Based on the horizontal synchronizing signal Hsync and the vertical synchronizing signal Vsync of the RGB input signals Rin, Gin, and Bin, a vertical counter (V_CNT) 12 outputs a vertical position signal indicating the vertical position on the screen (on the display panel 3, or 3*a* described later) corresponding to the RGB input signals Rin, Gin, and Bin.

Incidentally, the vertical and horizontal synchronizing signals Vsync and Hsync (and the dot signal CLK) are fed also to an unillustrated timing generation circuit, which produces, based on the vertical and horizontal synchronizing signals Vsync and Hsync (and the dot signal CLK), timing signals necessary for image display, which are fed to the D/A conversion circuit 2 and to the display panel 3 (or 3*a* described later).

The defect position specifier 15 has previously stored therein defect information that identifies the positions (horizontal and vertical) of defective (faulty) unit pixels on the screen. Specifically, when the organic EL display device is fabricated, in an inspection step, every unit pixel is inspected to check whether it emits light as desired, and those pixels which do not emit light as desired (for example, do not emit light at all) are branded as defective, so that defective information that identifies the positions (horizontal and vertical) of those defective pixels (the unit pixels found defective) is stored in the defect position specifier 15 built with a nonvolatile memory or the like.

The comparator 13 compares the horizontal position on the screen corresponding to the RGB input signals, as identified with the horizontal position signal from the horizontal counter 11, with the horizontal position (or the horizontal position near this horizontal position) of the defective pixel as identified with the defect information from the defect position specifier 15, and feeds the result of the comparison to the selector 16. The comparator 14 compares the vertical position on the screen corresponding to the RGB input signals, as identified with the vertical position signal from the vertical counter 12, with the vertical position (or the vertical position near this vertical position) of the defective pixel as identified with the defect information from the defect position specifier 15, and feeds the result of the comparison to the selector 16.

According to the comparison results from the comparators 13 and 14, the selector 16 selects one among a plurality of candidate values, and outputs the selected value as the W pixel use rate (the RGB-signals-to-W-signal conversion rate) $W_{GAIN}$. As will be seen in the practical numerical examples presented later, the value selected here is, for example, 1 (100%) or 0.75 (75%).

The R-W, G-W, and B-W converters 20R, 20G, and 20B calculate, from the R, G, and B signals Rin, Gin, and Bin, the value R1, G1 and B1 by formulae (10), (11), and (12) noted below. Here, the ratio in which RGB input signals are converted into a W signal is assumed to be "$\alpha_R:\alpha_G:\alpha_B$". If, as in the third numerical example described above, (Rin, Gin, Bin)=(220, 180, 100) and $\alpha_R:\alpha_G:\alpha_B$=1.00:1.20:1.15 ($\alpha_R$=1.00, $\alpha_G$=1.20, $\alpha_B$=1.15), then formulae (10) to (12) noted below agree with formulae (1) to (3), respectively, noted above.

$$R1=R\text{in}\times\alpha_R \tag{10}$$

$$G1=G\text{in}\times\alpha_G \tag{11}$$

$$B1=B\text{in}\times\alpha_B \tag{12}$$

The minimum value calculator 21 calculates the minimum value min(R1, G1, B1) among R1, G1, and B1 calculated by the R-W, G-W, and B-W converters 20R, 20G, and 20B, and outputs the value, as the maximum-conversion W signal value $W_{MAX}$, to the multiplier 22 provided in the following stage. In the third numerical example described above, the maximum-conversion W signal value $W_{MAX}$ equals 115.

The multiplier 22 multiplies the maximum-conversion W signal value $W_{MAX}$ from the minimum value calculator 21 by the W pixel use rate $W_{GAIN}$ from the selector 16; the multiplier 22 outputs the result of the multiplication as the W signal Wout, and feeds the same result of multiplication to the W-R, W-G, and W-B converters 23R, 23G, and 23B. If, as in the third numerical example described above, $W_{MAX}$=115 and $W_{GAIN}$=0.7, then Wout=80 (≈115×0.7).

To calculate the RGB signals as they are after conversion to RGBW signals (that is, to calculate Rout, Gout, ad Bout), the W-R, W-G, and W-B converters 23R, 23G, and 23B calculate the component R2 of the R signal Rin, the component G2 of the G signal Gin, and the component B2 of the B signal Bin that are converted into Wout by formulae (13), (14), and (15) noted below. If, as in the third numerical example described above, Wout=80 and $\alpha_R:\alpha_G:\alpha_B$=1.00:1.20:1.15, then formulae (13), (14), and (15) noted below agree with formulae (7) to (9), respectively, noted above, and thus, as shown in graph P11 in FIG. 5, (R2, G2, B2)=(80, 66, 69).

$$R2=W\text{out}/\alpha_R \tag{13}$$

$$G2=W\text{out}/\alpha_G \tag{14}$$

$$B2=W\text{out}/\alpha_B \tag{15}$$

The subtracters 24R, 24G, and 24B subtract R2, G2, and B2, which are the results of the calculation by the W-R, W-G, and W-B converters 23R, 23G, and 23B, from the R, G, and B signals Rin, Gin, and Bin, and outputs the result of the subtraction as Rout, Gout, and Bout. Thus, if, as in the third numerical example described above, (Rin, Gin, Bin)=(220, 180, 100) and (R2, G2, B2)=(80, 66, 69), then, as shown in graph P12 in FIG. 5, (Rout, Gout, Bout)=(140, 114, 31).

Figure 7:
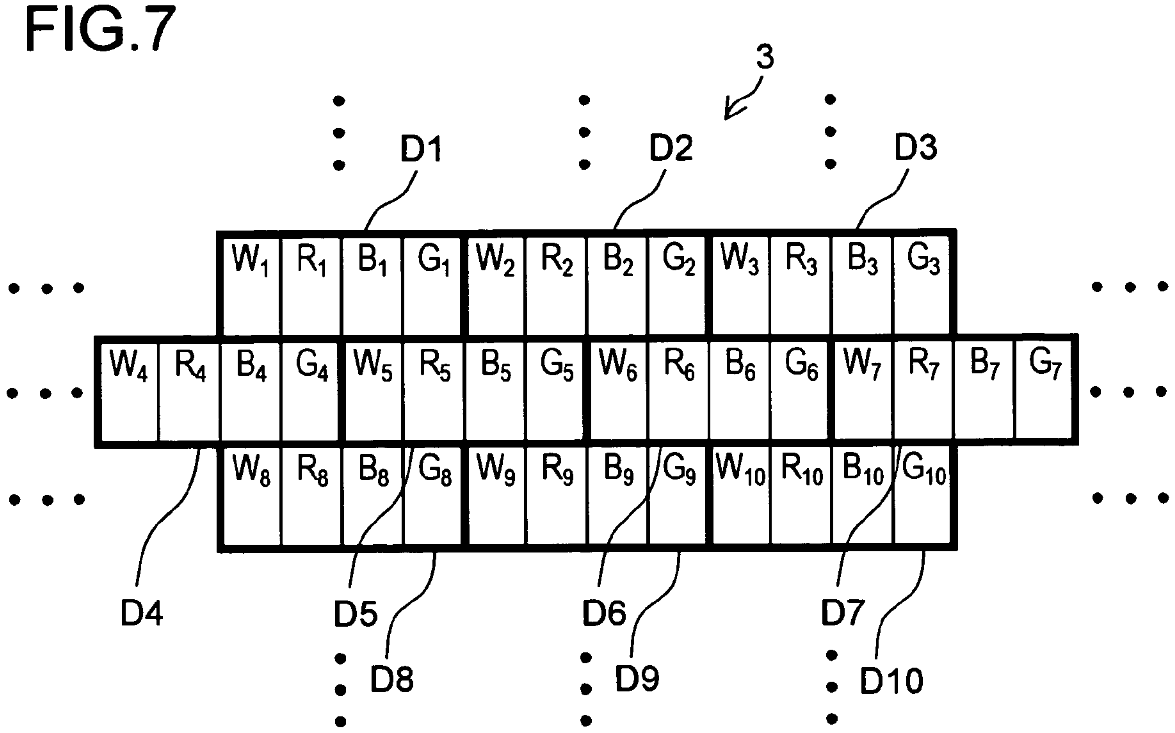
FIG. 7 is a diagram showing the array of dots and the array of unit pixels within each dot in the display panel (organic EL display panel) shown in FIG. 1.

Next, the configuration inside the display panel 3 shown in FIG. 1 will be described. FIG. 7 is a diagram showing the array of dots and the array of unit pixels within each dot in the display panel 3 shown in FIG. 1. The array shown in FIG. 7 is a so-called delta array. In FIG. 7, dots D1, D2, and D3 lie horizontally side by side in this order from left to right; dots D4, D5, D6, and D7 lie horizontally side by side in this order from left to right; dots D8, D9, and D10 lie horizontally side by side in this order from left to right. With respect to the horizontal line along which the dots D4, D5, D6, and D7 lie, the dots D1, D2, and D3 lie one unit pixel above, and the D8, D9, and D10 lie one unit pixel below. FIG. 7 shows only part of the display panel 3, and, in reality, though unillustrated, a large number of dots other than the dots D1 to D10 lie above and below them (in the vertical direction across the display panel 3) and to the left and right of them (in the horizontal direction across the display panel 3), with the same positional relationship kept among them as among the dots D1 to D10.

The dot D1 is composed of four unit pixels, namely a W pixel $W_1$, an R pixel $R_1$, a B pixel $B_1$, and a G pixel $G_1$. These unit pixels lie one adjacent to the next in the order of the W pixel $W_1$, then the R pixel $R_1$, then the B pixel $B_1$, and then the G pixel $G_1$ from left to right. The same is true with the other dots D2 to D10. Specifically, each dot Dn, where n represents an integer between 2 and 10, is composed of four unit pixels, namely a W pixel $W_n$, an R pixel $R_n$, a B pixel $B_n$, and a G pixel $G_n$, and, in the dot Dn, those unit pixels lie one adjacent to the next in the order of the W pixel $W_n$, then the R pixel $R_n$, then the B pixel $B_n$, and then the G pixel $G_n$ from left to right.

In the following description, the W pixel $W_1$, the R pixel $R_1$, the B pixel $B_1$, and the G pixel $G_1$ are also referred to simply as $W_1$, $R_1$, $B_1$, and $G_1$, respectively; likewise, the W pixel $W_n$, the R pixel $R_n$, the B pixel $B_n$, and the G pixel $G_n$ are also referred to simply as $W_n$, $R_n$, $B_n$, and $G_n$ (where n represents an integer between 2 and 10).

As will be clear from the positional relationship described above, $W_1$, $R_1$, $B_1$, $G_1$, $W_2$, $R_2$, $B_2$, $G_2$, $W_3$, $R_3$, $B_3$, and $G_3$ lie one adjacent to the next in this order from left to right; likewise, $W_4$, $R_4$, $B_4$, $G_4$, $W_5$, $R_5$, $B_5$, $G_5$, $W_6$, $R_6$, $B_6$, $G_6$, $W_7$, $R_7$, $B_7$, and $G_7$ lie one adjacent to the next in this order from left to right; likewise, $W_8$, $R_8$, $B_8$, $G_8$, $W_9$, $R_9$, $B_9$, $G_9$, $W_{10}$, $R_{10}$, $B_{10}$, and $G_{10}$ lie one adjacent to the next in this order from left to right.

Moreover, as shown in FIG. 7, the dots D1 and D8 agree in their horizontal position, so do the dots D2 and D9, and so do the dots D3 and D10. The dot D4 lies two unit pixels to the left of the dot D1. Likewise, the dot D5 lies two unit pixels to the left of the dot D2, and the dot D6 lies two unit pixels to the left of the dot D3. The dot D7 lies two unit pixels to the right of the dot D3. Thus, for example, $B_2$ lies adjacently above $W_6$, and $B_9$ lies adjacently below $W_6$.

The RGB input signals for the dot D1 are converted into the RGBW signals for the dot D1 by the RGB-RGBW conversion circuit 1. Likewise, the RGB input signals for the dot Dn are converted into the RGBW signals for the dot Dn by the RGB-RGBW conversion circuit 1 (where n represents an integer between 2 and 10).

Examples of Adjustment of W Pixel Use Rate

Next, how the W pixel use rate (the RGB-signals-to-W-signal conversion rate) $W_{GAIN}$ is set to cope with a pixel defect will be described by way of practical examples. In the following description, all unit pixels are assumed to be normally functioning unless explicitly stated as being defective. It is also assumed that a standard conversion rate is previously set for the entire display panel 3 (or 3*a* described later) so that, if none of all the unit pixels forming the display panel 3 (or 3*a* described later) is defective, the W pixel use rate $W_{GAIN}$ is kept equal to the standard conversion rate for all the unit pixels. The maximum value of the standard conversion rate is 100%, and the standard conversion rate has, for example, a fixed value. For the sake of simplicity, it is also assumed that, for all the dots D1 to D10, the RGB input signals have values of (Rin, Gin, Bin)=(220, 180, 100) and that $\alpha_R$:$\alpha_G$:$\alpha_B$=1.00:1.20:1.15.

Figure 8:
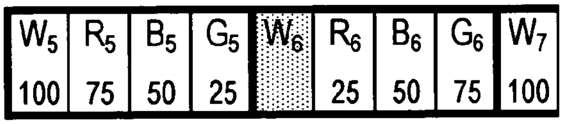
FIG. 8 is a diagram illustrating an example of how the W pixel use rate is set (a first example of setting) to cope with a defective pixel in the first embodiment.

First, a first example of setting will be described. Suppose now that the W pixel $W_6$ is defective (non-luminous). In this case, based on the defect information that identifies the position of the defective W pixel $W_6$, the RGB-RGBW conversion circuit 1 sets the W pixel use rate (the RGB-signals-to-W-signal conversion rate) $W_{GAIN}$ for $R_5$, $B_5$, $G_5$, $R_6$, $B_6$, and $G_6$ at 75%, 50%, 25%, 25%, 50%, and 75%, respectively, as shown in FIG. 8. That is, the smaller the distance from the defective pixel, the lower the W pixel use rate $W_{GAIN}$ is set. For all the other unit pixels including the W pixels $W_5$ and $W_7$, the W pixel use rate $W_{GAIN}$ is set equal to the standard conversion rate, namely 100%. In the first example of setting, the standard conversion rate may be set lower than 100% (for example 90%).

Figure 9:
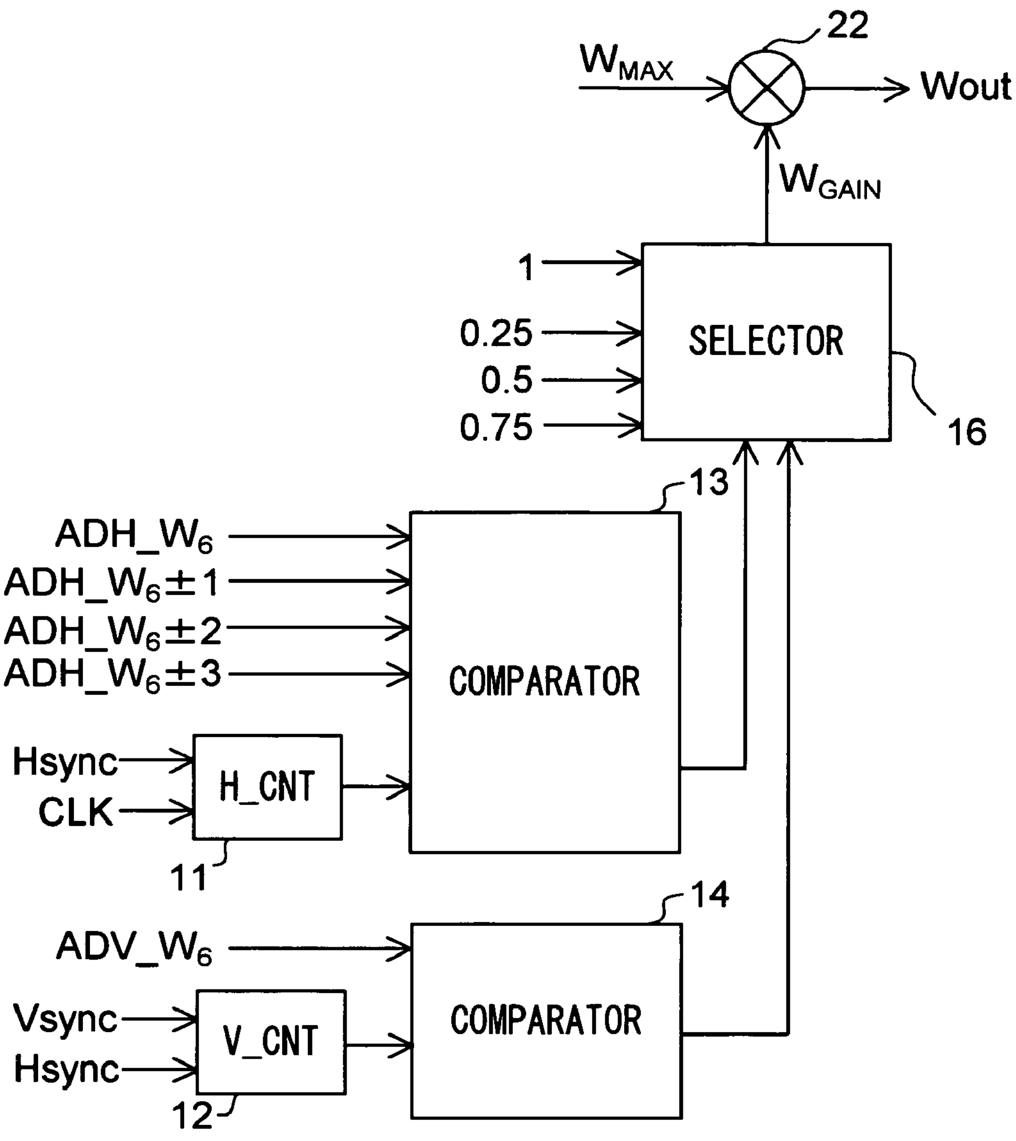
FIG. 9 is a diagram showing a specific example of the input signals to the comparators and the selector shown in FIG. 6 (corresponding to the first example of setting)

FIG. 9, which shows part of the configuration inside and around the RGB-RGBW conversion circuit 1, specifically shows the input signals to the comparators 13 and 14 and the selector 16 as observed when the first example of setting is adopted. In FIG. 9, such parts as are found also in FIG. 6 are identified with common reference numerals and symbols.

From the defect position specifier 15, the comparator 13 receives the horizontal position (ADH_$W_6$) of the defective W pixel $W_6$, the horizontal positions (ADH_$W_6$±1) one unit pixel to the left and right of the horizontal position of the defective pixel, the horizontal positions (ADH_$W_6$±2) two unit pixels to the left and right of the horizontal position of the defective pixel, and the horizontal positions (ADH_$W_6$±3) three unit pixels to the left and right of the horizontal position of the defective pixel. The comparator 13 checks whether these seven horizontal positions fed from the defect position specifier 15 agree or disagree with the horizontal position on the screen corresponding to the RGB input signals Rin, Gin, and Bin as fed from the horizontal counter 11, and feeds a signal indicating agreement or disagreement to the selector 16.

From the defect position specifier 15, the comparator 14 receives the vertical position (ADV_$W_6$) of the defective W pixel $W_6$. The comparator 14 checks whether this vertical position fed from the defect position specifier 15 agrees or disagrees with the vertical position on the screen corresponding to the RGB input signals Rin, Gin, and Bin as fed from the vertical counter 12, and feeds a signal indicating agreement or disagreement to the selector 16.

The selector 16 receives, as candidate values, 25%, 50%, 75%, and the standard conversion rate, namely 100%, and sets, according to the outputs of the comparators 13 and 14, $W_{GAIN}$ for each unit pixel as shown in FIG. 8. Specifically, for example, if the signals fed from the comparators 13 and 14 to the selector 16 indicate that the vertical position (ADV_$W_6$) of the defective pixel agrees with the vertical position on the screen corresponding to the RGB input signals Rin, Gin, and Bin as fed from the vertical counter 12 and that the horizontal position (ADH_$W_6$−1) one unit pixel to the left of the horizontal position of the defective pixel agrees with the horizontal position on the screen corresponding to the RGB input signals Rin, Gin, and Bin as fed from the horizontal counter 11, the selector 16 selects, among the four candidate values, 25% corresponding to the G pixel G5, and outputs this value as $W_{GAIN}$.

FIG. 10 is a diagram illustrating the values of the signals fed to each unit pixel in the first example of setting. First, consider the W pixel $W_5$, for which $W_{GAIN}$=100%. As described above, for the dot D5, the RGB input signals has values of (Rin, Gin, Bin)=(220, 180, 100) and in addition $\alpha_R$:$\alpha_G$:$\alpha_B$=1.00:1.20:1.15. Thus, when $W_{GAIN}$=100%, as shown in FIG. 10, the multiplier 22 outputs a signal representing a value of 115, and the subtracters 24R, 24G, and 24B output signals representing values of 105, 85, and 0, respectively (see also graph P8 in FIG. 4). The value (115) of, among these signals, the signal outputted from the multiplier 22 is used as the value of the W signal Wout corresponding to the W pixel $W_5$.

Now, consider the R pixel $R_5$, for which $W_{GAIN}$=75%. When $W_{GAIN}$=75%, as shown in FIG. 10, the multiplier 22 outputs a signal representing a value of 86 (=115×0.75), and the subtracters 24R, 24G, and 24B output signals representing values of 134 (=220−86/1.00), 109 (=180−86/1.20), and 26 (=100−86/1.15), respectively. The value (134) of among these signals, the signal outputted from the subtracter 24R is used as the value of the R signal Rout corresponding to the R pixel $R_5$.

Now, consider the G pixel $G_5$, for which $W_{GAIN}$=25%. When $W_{GAIN}$=25%, as shown in FIG. 10, the multiplier 22 outputs a signal representing a value of 28 (=115×0.25), and the subtracters 24R, 24G, and 24B output signals representing values of 192 (=220−28/1.00), 157 (=180−28/1.20), and 76 (=100−28/1.15), respectively. The value (157) of among these signals, the signal outputted from the subtracter 24G is used as the value of the G signal Gout corresponding to the G pixel $G_5$.

Now, consider the R pixel $R_6$, for which $W_{GAIN}$=25%. When $W_{GAIN}$=25%, as shown in FIG. 10, the multiplier 22 outputs a signal representing a value of 28 (=115×0.25), and the subtracters 24R, 24G, and 24B output signals representing values of 192 (=220−28/1.00), 157 (=180−28/1.20), and 76 (=100−28/1.15), respectively. The value (192) of among these signals, the signal outputted from the subtracter 24R is used as the value of the R signal Rout corresponding to the R pixel $R_6$.

For each of the other unit pixels including $B_5$, $B_6$, $G_6$, and $W_7$, operations similar to those described above with respect to $W_5$, $R_5$, etc. are performed, so that the B signal Bout corresponding to $B_5$, the B signal Bout corresponding to $B_6$, the G signal Gout corresponding to $G_6$, and the W signal Wout corresponding to $W_7$ have values 51, 51, 109, and 115, respectively. Incidentally, the W signal Wout corresponding to the defective pixel $W_6$ is give, for example, a value of 0.

If no consideration is given to the defect in $W_6$, and $W_{GAIN}$ is set equal to the standard conversion rate, namely 100%, for all of $R_5$, $B_5$, $G_5$, $R_6$, $B_6$, and $G_6$, then, as will be understood from the numerical example described above and from FIG. 11, the RGB signals for the dots D5 and D6 as they are after conversion into RGBW signals will have values (Rout, Gout, Bout)=(105, 85, 0). This causes the defective (non-luminous) W pixel $W_6$ to appear as a very conspicuous black spot when white is displayed.

By contrast, setting $W_{GAIN}$ for pixels around the defective W pixel lower than the standard conversion rate as described above eventually makes the brightness of those nearby pixels comparatively high, and thus makes the defect in the W pixel less conspicuous (in particular, by preventing it from appearing as a conspicuous black spot when white is displayed).

In a case where the W pixel $W_6$ is defective, simply setting $W_{GAIN}$ for at least one of the four unit pixels ($G_5$, $R_6$, $B_2$, and $B_9$) adjacent to the W pixel $W_6$ lower than the standard conversion rate helps make the defect less conspicuous. For example, $W_{GAIN}$ for $G_5$ is set at 25%, and $W_{GAIN}$ for all the other unit pixels are set equal to the standard conversion rate.

Incidentally, the comparators 13 and 14 and the selector 16 function as a conversion rate controller (use rate controller) that controls (sets) the W pixel use rate, that is, the RGB-signals-to-W-signal conversion rate $W_{GAIN}$, for each unit pixel. The multiplier 22 may also be considered as part of the conversion rate controller.

Figure 12:
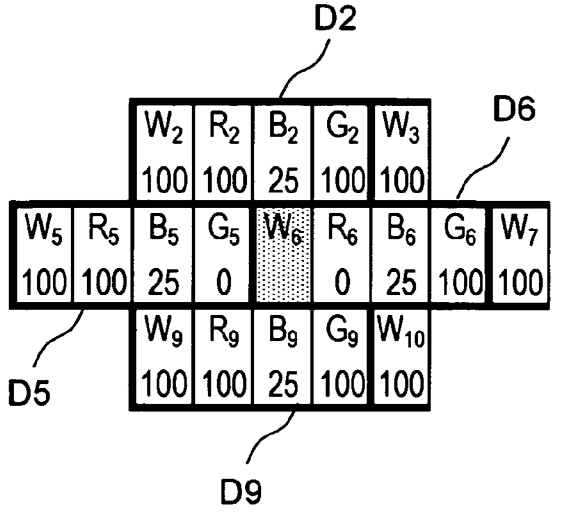
FIG. 12 is a diagram illustrating another example of how the W pixel use rate is set (a second example of setting)

Next, a second example of setting will be described. Suppose now that the W pixel $W_6$ is defective (non-luminous). In this case, as shown in FIG. 12, based on the defect information that identifies the position of the defective W pixel $W_6$, the RGB-RGBW conversion circuit 1 sets the W pixel use rate $W_{GAIN}$ for $B_5$, $G_5$, $R_6$, $B_6$, $B_2$, and $B_9$ at 25%, 0%, 0%, 25%, 25%, and 25%, respectively. That is, the smaller the distance from the defective pixel, the lower the W pixel use rate $W_{GAIN}$ is set. For all the other unit pixels including the R pixels $R_5$, the W pixel use rate $W_{GAIN}$ is set equal to the standard conversion rate, namely 100%. In the second example of setting, the standard conversion rate may be set lower than 100% (for example 90%).

This, too, makes the brightness of pixels ($B_5$, $G_5$, $R_6$, $B_6$, $B_2$, and $B_9$) around the defective pixel comparatively high, and thus makes the defect in the W pixel less conspicuous (in particular, by preventing it from appearing as a conspicuous black spot when white is displayed).

Figure 13:
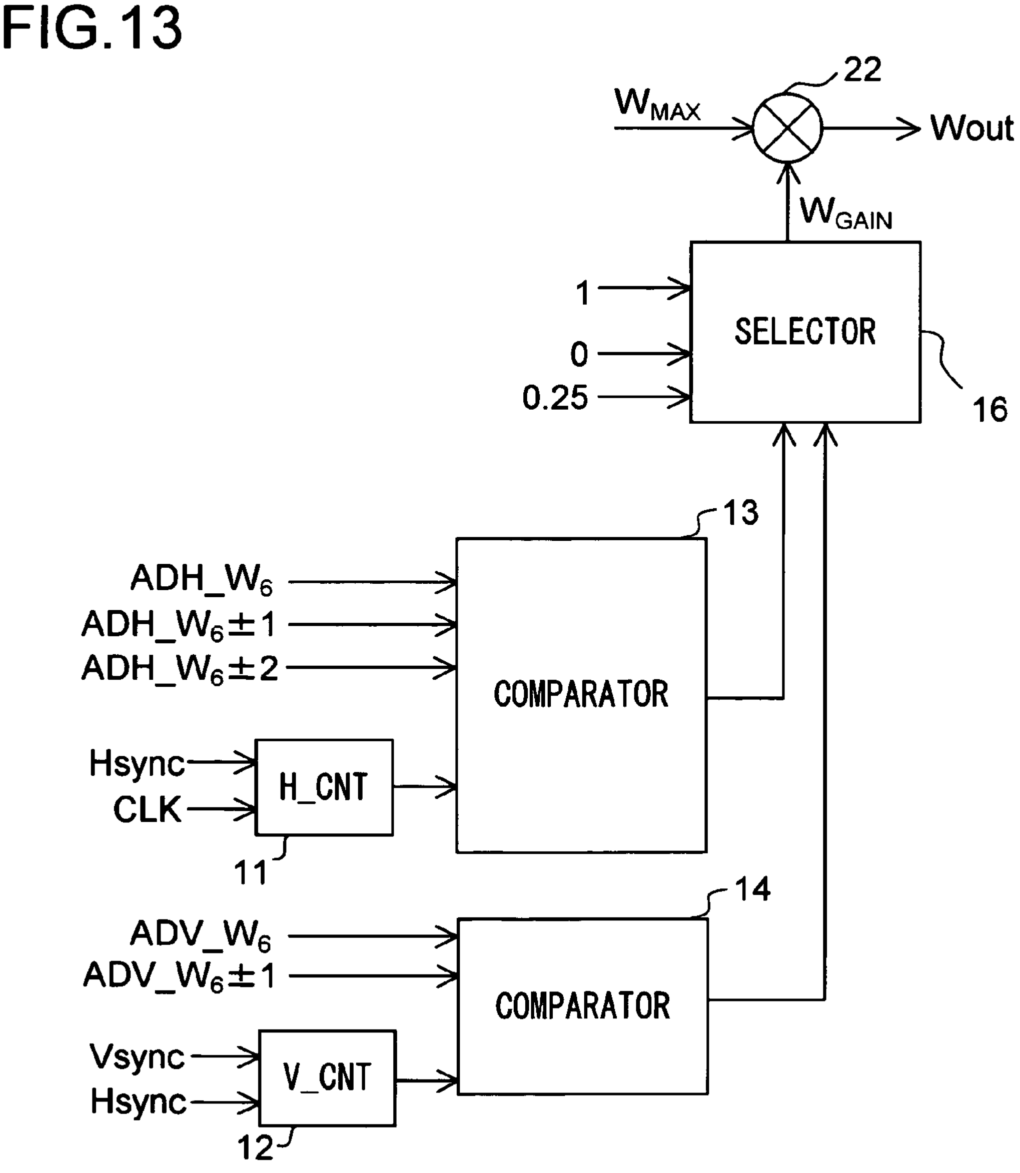
FIG. 13 is a diagram showing a specific example of the input signals to the comparators and the selector shown in FIG. 6 (corresponding to the second example of setting)

FIG. 13, which shows part of the configuration inside and around the RGB-RGBW conversion circuit 1, specifically shows the input signals to the comparators 13 and 14 and the selector 16 as observed when the second example of setting is adopted. In FIG. 13, such parts as are found also in FIG. 6 are identified with common reference numerals and symbols.

From the defect position specifier 15, the comparator 13 receives the horizontal position (ADH_$W_6$) of the defective W pixel $W_6$, and the horizontal positions (ADH_$W_6$±1) one unit pixel to the left and right of the horizontal position of the defective pixel, the horizontal positions (ADH_$W_6$±2) two unit pixels to the left and right of the horizontal position of the defective pixel. The comparator 13 checks whether these five horizontal positions fed from the defect position specifier 15 agree or disagree with the horizontal position on the screen corresponding to the RGB input signals Rin, Gin, and Bin as fed from the horizontal counter 11, and feeds a signal indicating agreement or disagreement to the selector 16.

From the defect position specifier 15, the comparator 14 receives the vertical position (ADV_$W_6$) of the defective W pixel $W_6$ and the vertical positions (ADV_$W_6$±1) one unit pixel above and below the vertical position of the defective W pixel $W_6$. The comparator 14 checks whether these three vertical positions fed from the defect position specifier 15 agree or disagree with the vertical position on the screen corresponding to the RGB input signals Rin, Gin, and Bin as fed from the vertical counter 12, and feeds a signal indicating agreement or disagreement to the selector 16.

The selector 16 receives, as candidate values, 0%, 25%, and the standard conversion rate, namely 100%, and sets, according to the outputs of the comparators 13 and 14, $W_{GAIN}$ for each unit pixel as shown in FIG. 12. Specifically, for example, if the signals fed from the comparators 13 and 14 to the selector 16 indicate that the vertical position (ADV_$W_6$±1) one unit pixel below the defective pixel agrees with the vertical position on the screen corresponding to the RGB input signals Rin, Gin, and Bin as fed from the vertical counter 12 and that the horizontal position (ADH_$W_6$) of the defective pixel agrees with the horizontal position on the screen corresponding to the RGB input signals Rin, Gin, and Bin as fed from the horizontal counter 11, the selector 16 selects, among the three candidate values, 25% corresponding to the B pixel $B_9$, and outputs this value as $W_{GAIN}$.

As a modification, an adder (unillustrated) may be inserted between the subtracter 24G and the D/A conversion circuit 2 so that a predetermined offset is added to the output from the subtracter 24G corresponding to the G pixel $G_5$ adjacent to the defective pixel and the result is eventually used as the G signal Gout corresponding to the G pixel $G_5$. This helps further increase the brightness of the G pixel $G_5$ and thereby make the defect in the W pixel less conspicuous. Instead of such an adder, a multiplier (unillustrated) may be used so that the output from the subtracter 24G corresponding to the G pixel $G_5$ adjacent to the defective pixel is multiplied by a predetermined value greater than one (for example, 1.1) and the result is eventually used as the G signal Gout corresponding to the G pixel $G_5$.

Likewise, an adder (unillustrated) for adding a predetermined offset may be inserted between the subtracter 24R and the D/A conversion circuit 2 so that the predetermined offset is added to the output from the subtracter 24R corresponding to the R pixel $R_6$ adjacent to the defective pixel and the result is eventually used as the R signal Rout corresponding to the R pixel $R_6$. Instead of such an adder, a multiplier (unillustrated) may be used so that the output from the subtracter 24R corresponding to the R pixel $R_6$ is multiplied by a predetermined value greater than one (for example, 1.1) and the result is eventually used as the R signal Rout corresponding to the R pixel $R_6$.

Likewise, an adder (unillustrated) for adding a predetermined offset may be inserted between the subtracter 24B and the D/A conversion circuit 2 so that the predetermined offset is added to the output from the subtracter 24B corresponding to the B pixel $B_2$ ($B_9$, $B_5$, $B_6$) adjacent to the defective pixel and the result is eventually used as the B signal Bout corresponding to the B pixel $B_2$ ($B_9$, $B_5$, $B_6$). Instead of such an adder, a multiplier (unillustrated) may be used so that the output from the subtracter 24B corresponding to the B pixel $B_2$ ($B_9$, $B_5$, $B_6$) is multiplied by a predetermined value greater than one (for example, 1.1) and the result is eventually used as the B signal Bout corresponding to the B pixel $B_2$ ($B_9$, $B_5$, $B_6$).

Figure 14:
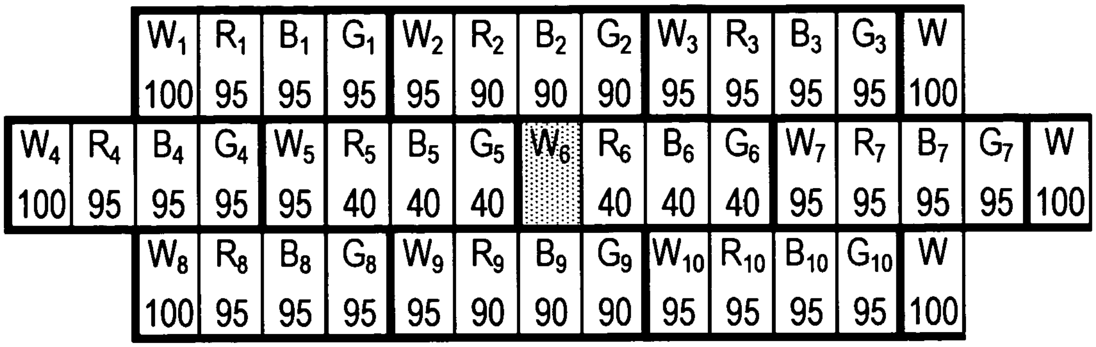
FIG. 14 is a diagram illustrating another example of how the W pixel use rate is set (a third example of setting)

Next, a third example of setting will be described. Suppose now that the W pixel $W_6$ is defective (non-luminous). In this case, as shown in FIG. 14, based on the defect information that identifies the position of the defective W pixel $W_6$, the RGB-RGBW conversion circuit 1 sets the W pixel use rate $W_{GAIN}$ for all the RGB pixels in the dots D5 and D6 at 40%, the W pixel use rate $W_{GAIN}$ for all the RGB pixels in the dots D2 and D9 at 90%, and the W pixel use rate $W_{GAIN}$ for all the RGB pixels in the dots D1, D3, D4, D7, D8, and D10 at 95%; it also sets $W_{GAIN}$ for the W pixels $W_1$, $W_2$, $W_3$, $W_4$, $W_5$, $W_7$, $W_8$, $W_9$, and $W_{10}$ at 100%, 95%, 95%, 100%, 95%, 95%, 100%, 95%, and 95%, respectively; it also sets $W_{GAIN}$ for all the other unit pixels equal to the standard conversion rate, namely 100%. In the third example of setting, the standard conversion rate may be set lower than 100% (for example 98%>95%).

In the third example of setting, the smaller the distance from the defective pixel, the lower the W pixel use rate $W_{GAIN}$ is set, and in addition $W_{GAIN}$ for the nearby pixels in a comparatively wide area is set lower than the standard conversion rate. In this way, by compensating for the defect by using nearby pixels in a wide area and setting $W_{GAIN}$ increasingly low the closer to the defective pixel, it is possible to make the defect in the W pixel less conspicuous (in particular, by preventing it from appearing as a conspicuous black spot when white is displayed).

Incidentally, in the third example of setting, four dots, namely D2, D5, D6, and D9, include unit pixels adjacent to the defective pixel, and $W_{GAIN}$ for all the RGB pixels (or RGBW pixels) included in the dots D2, D5, D6, and D9 is set lower than the standard conversion rate (100%).

Though different from what is shown in FIG. 14, it is also possible to set $W_{GAIN}$ for the RGB pixels (or RGBW pixels) in only one, two, or three of the dots D2, D5, D6, and D9 lower than the standard conversion rate.

As a modification, adders (unillustrated) may be inserted between the subtracters 24R, 24G, and 24B, respectively, and the D/A conversion circuit 2 so that a predetermined offset is added to the outputs from the subtracters 24R, 24G, and 24B corresponding to the RGB pixels included in the dot D2 (D5, D6, or D9) and the results are eventually used as Rout, Gout, and Bout corresponding to the RGB pixels included in the dot D2 (D5, D6, or D9). This helps further increase the brightness of the RGB pixels included in the dot D2 (D5, D6, or D9) and thereby make the defect in the W pixel less conspicuous. Instead of such adders, multipliers (unillustrated) may be used so that the outputs from the subtracters 24R, 24G, and 24B corresponding to the RGB pixels included in the dot D2 (D5, D6, or D9) are multiplied by a predetermined value greater than one (for example, 1.1) and the results are eventually used as Rout, Gout, and Bout corresponding to the RGB pixels included in the dot D2 (D5, D6, or D9).

Figure 15:
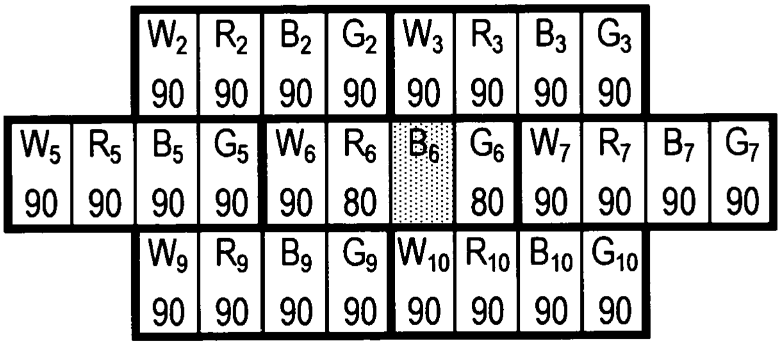
FIG. 15 is a diagram illustrating another example of how the W pixel use rate is set (a fourth example of setting)

Next, a fourth example of setting will be described. Suppose now that a unit pixel other than a W pixel, for example, the B pixel $B_6$, is defective (non-luminous), and assume that the standard conversion rate is set at 90%. In this case, as shown in FIG. 15, based on the defect information that identifies the position of the defective B pixel $B_6$, the RGB-RGBW conversion circuit 1 sets the W pixel use rate $W_{GAIN}$ for the unit pixels $R_6$ and $G_6$ adjacently to the left and right of the defective pixel lower than the standard conversion rate, namely at 80%; it sets the W pixel use rate $W_{GAIN}$ for all the unit pixels other than $R_6$ and $G_6$ equal to the standard conversion rate, namely 90%. In the fourth example of setting, the standard conversion rate may be set at 100%. This makes the brightness of the unit pixels $R_6$ and $G_6$ adjacent to the defective pixel comparatively high, compensating for the defect in $B_6$ and making it less conspicuous.

In this way, in a case where a unit pixel other than a W pixel (in the fourth example of setting, a B pixel) is defective, $W_{GAIN}$ for the non-W unit pixels adjacent to the defective pixel is set lower than the standard conversion rate set over the entire display panel. Here, $W_{GAIN}$ may be set lower than the standard conversion rate only for one (for example, in the fourth example of setting, the R pixel $R_6$) of the unit pixels adjacent to the defective pixel.

As a modification, an adder (unillustrated) may be inserted between the subtracter 24R (24G) and the D/A conversion circuit 2 so that a predetermined offset is added to the output from the subtracter 24R (24G) corresponding to $R_6$ ($G_6$) adjacent to the defective pixel and the result is eventually used as the R signal Rout (G signal Gout) corresponding to $R_6$ ($G_6$). This helps further increase the brightness of $R_6$ ($G_6$) and thereby make the defect in the B pixel less conspicuous. Instead of such an adder, a multiplier (unillustrated) may be used so that the output from the subtracter 24R (24G) corresponding to $R_6$ ($G_6$) adjacent to the defective pixel is multiplied by a predetermined value greater than one (for example, 1.1) and the result is eventually used as the R signal Rout (G signal Gout) corresponding to $R_6$ ($G_6$).

What is aimed at in the fourth example of setting is to compensate for the defect in $B_6$, which corresponds to blue, with an increase in the brightness of red and green. Since the chromaticity of blue greatly differs from the chromaticities of red and green, however, the part where such compensation is made may appear unnaturally colored.

Figure 16:
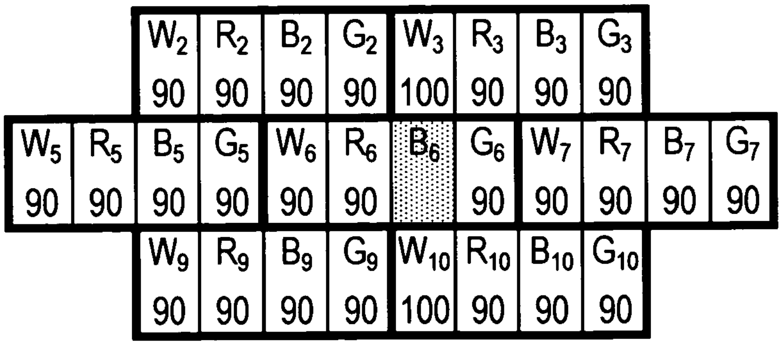
FIG. 16 is a diagram illustrating another example of how the W pixel use rate is set (a fifth example of setting)

As a solution to this inconvenience, next, a fifth example of setting will be described. Suppose now that a unit pixel other than a W pixel, for example, the B pixel $B_6$, is defective (non-luminous), and assume that the standard conversion rate is set at 90%. In this case, as shown in FIG. 16, based on the defect information that identifies the position of the defective B pixel $B_6$, the RGB-RGBW conversion circuit 1 sets the W pixel use rate $W_{GAIN}$ for the W pixels $W_3$ and $W_{10}$ adjacently above and below the defective pixel higher than the standard conversion rate, namely at 100%; it sets the W pixel use rate $W_{GAIN}$ for all the unit pixels other than $W_3$ and $W_{10}$ equal to the standard conversion rate, namely 90%. This makes the brightness of $W_3$ and $W_{10}$ adjacent to the defective pixel comparatively high, compensating for the defect in $B_6$ and making it less conspicuous.

Here, since the chromaticity of W pixels is close to the mean of the chromaticities of blue, red, and green, less unnaturalness is visible than when the defect in $B_6$, which corresponds to blue, is compensated for with an increase in the brightness of red and green as in the fourth example of setting.

In this way, in a case where a unit pixel other than a W pixel (in the fifth example of setting, a B pixel) is defective, $W_{GAIN}$ for the W unit pixels adjacent to the defective pixel is set higher than the standard conversion rate set over the entire display panel. Here, $W_{GAIN}$ may be set higher than the standard conversion rate only for one (for example, in the fifth example of setting, the W pixel $W_3$) of the W pixels adjacent to the defective pixel.

As a modification, an adder (unillustrated) may be inserted between the multiplier 22 and the D/A conversion circuit 2 so that a predetermined offset is added to the output from the multiplier 22 corresponding to $W_3$ ($W_{10}$) adjacent to the defective pixel and the result is eventually used as the W signal Wout corresponding to $W_3$ ($W_{10}$). This helps further increase the brightness of $W_3$ ($W_{10}$) and thereby make the defect in the B pixel less conspicuous. Instead of such an adder, a multiplier (unillustrated) may be used so that the output from the multiplier 22 corresponding to $W_3$ ($W_{10}$) adjacent to the defective pixel is multiplied by a predetermined value greater than one (for example, 1.1) and the result is eventually used as the W signal Wout corresponding to $W_3$ ($W_{10}$).

Second Embodiment

Figure 17:
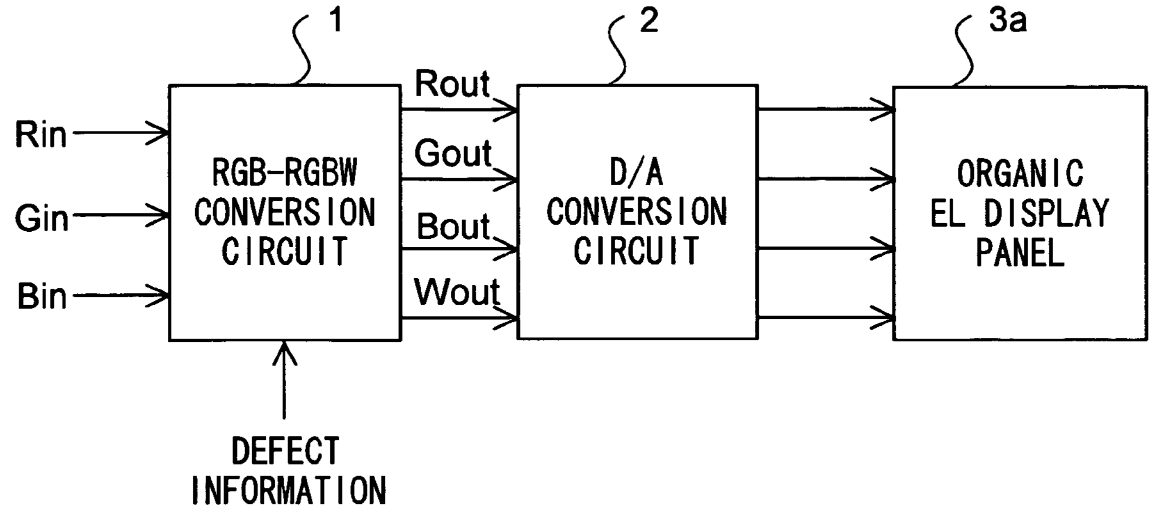
FIG. 17 is a block diagram showing the overall configuration of an organic EL display device of a second embodiment of the present invention.

Next, a second embodiment of the present invention will be described in detail with reference to the accompanying drawings. FIG. 17 shows the configuration of an organic EL display device of the second embodiment of the present invention. In FIG. 17, such parts as are found also in FIG. 1 are identified with common reference numerals and symbols, and no overlapping description will be repeated. As shown in FIG. 17, the organic EL display device of the second embodiment includes an RGB-RGBW conversion circuit 1, a D/A conversion circuit 2, and an organic EL display panel 3*a* (hereinafter referred to simply as the "display panel 3*a*"). The organic EL display device of the second embodiment is thus different from the organic EL display device of the first embodiment in that the display panel 3 is replaced with the display panel 3*a*, and is otherwise configured similarly thereto. The organic EL display device of this embodiment further includes a defect position specifier 15 and other components, which are omitted from illustration in FIG. 17.

Like the display panel 3 shown in FIG. 1, the display panel 3*a* is an RGBW-type display panel that displays a color image based on the analog RGBW signals obtained from the D/A conversion circuit 2. To display a color image, the display panel 3*a* has a plurality of dots arrayed in rows and columns. Each dot in the display panel 3*a* has the same configuration as each dot in the display panel 3 shown in FIG. 1, but the dots in the display panel 3*a* are arrayed in a so-called stripe array.

Figure 18:
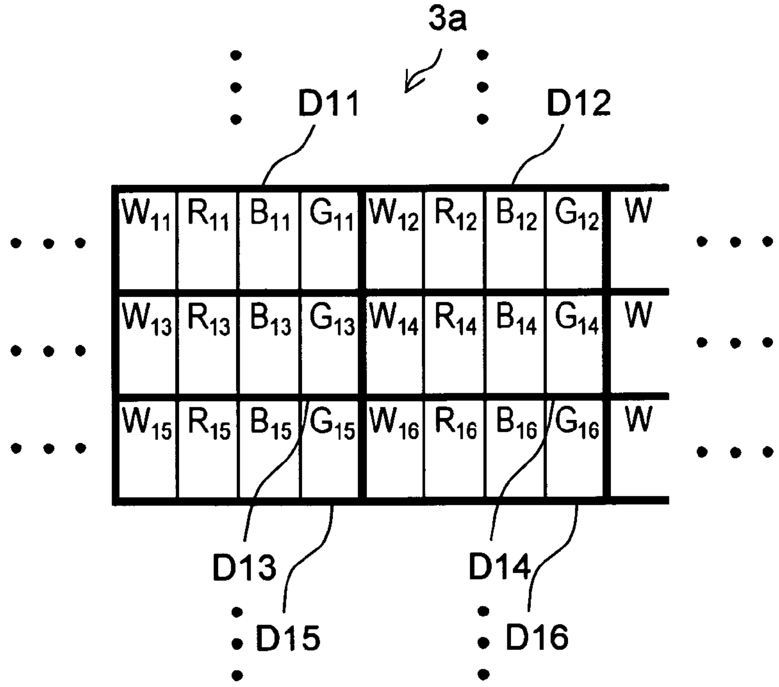
FIG. 18 is a diagram showing the array of dots and the array of unit pixels within each dot in the display panel (organic EL display panel) shown in FIG. 17.

Now, the configuration inside the display panel 3*a*, which has a stripe array, will be described. FIG. 18 is a diagram showing the array of dots and the array of unit pixels within each dot in the display panel 3*a* shown in FIG. 17. In FIG. 18, dots D11 and D12 lie horizontally side by side in this order from left to right; dots D13 and D14 lie horizontally side by side in this order from left to right; dots D15 and D16 lie horizontally side by side in this order from left to right. With respect to the horizontal line along which the dots D13 and D14 lie, the dots D11 and D12 lie one unit pixel above, and the D15 and D16 lie one unit pixel below. FIG. 18 shows only part of the display panel 3*a*, and, in reality, though unillustrated, a large number of dots other than the dots D11 to D16 lie above and below them (in the vertical direction across the display panel 3*a*) and to the left and right of them (in the horizontal direction across the display panel 3*a*), with the same positional relationship kept among them as among the dots D11 to D16.

The dot D11 is composed of four unit pixels, namely a W pixel $W_{11}$, an R pixel $R_{11}$, a B pixel $B_{11}$, and a G pixel $G_{11}$. These unit pixels lie one adjacent to the next in the order of the W pixel $W_{11}$, then the R pixel $R_{11}$, then the B pixel $B_{11}$, and then the G pixel $G_{11}$ from left to right. The same is true with the other dots D12 to D16. Specifically, each dot Dm, where m represents an integer between 12 and 16, is composed of four unit pixels, namely a W pixel $W_m$, an R pixel $R_m$, a B pixel $B_m$, and a G pixel $G_m$, and, in the dot Dm, those unit pixels lie one adjacent to the next in the order of the W pixel $W_m$, then the R pixel $R_m$, then the B pixel $B_m$, and then the G pixel $G_m$ from left to right.

In the following description, the W pixel $W_{11}$, the R pixel $R_{11}$, the B pixel $B_{11}$, and the G pixel $G_{11}$ are also referred to simply as $W_{11}$, $R_{11}$, $B_{11}$, and $G_{11}$, respectively; likewise, the W pixel $W_m$, the R pixel $R_m$, the B pixel $B_m$, and the G pixel $G_m$ are also referred to simply as $W_m$, $R_m$, $B_m$, and $G_m$ (where m represents an integer between 12 and 16).

As will be clear from the positional relationship described above, $W_{11}$, $R_{11}$, $B_{11}$, $G_{11}$, $W_{12}$, $R_{12}$, $B_{12}$, and $G_{12}$ lie one adjacent to the next in this order from left to right; likewise, $W_{13}$, $R_{13}$, $B_{13}$, $G_{13}$, $W_{14}$, $R_{14}$, $B_{14}$, and $G_{14}$ lie one adjacent to the next in this order from left to right; likewise, $W_{15}$, $R_{15}$, $B_{15}$, $G_{15}$, $W_{16}$, $R_{16}$, $B_{16}$, and $G_{16}$ lie one adjacent to the next in this order from left to right.

Moreover, as shown in FIG. 18, the dots D11, D13, and D15 agree in their horizontal position, and so do the dots D12, D14, and D16. Thus, for example, $W_{12}$ lies adjacently above $W_{14}$, and $W_{16}$ lies adjacently below $W_{14}$.

The RGB input signals Rin, Gin, and Bin for the dot D11 are converted into the RGBW signals for the dot D11 by the RGB-RGBW conversion circuit 1. Likewise, the RGB input signals Rin, Gin, and Bin for the dot Dm are converted into the RGBW signals for the dot Dm by the RGB-RGBW conversion circuit 1 (where m represents an integer between 12 and 16).

Examples of Adjustment of W Pixel Use Rate

Next, how the W pixel use rate $W_{GAIN}$ is set to cope with a pixel defect will be described by way of practical examples. In the following description, all unit pixels are assumed to be normally functioning unless explicitly stated as being defective. For the sake of simplicity, it is also assumed that, for all the dots D11 to D16, the RGB input signals have values of (Rin, Gin, Bin)=(220, 180, 100) and that $\alpha_R:\alpha_G:\alpha_B$=1.00:1.20:1.15.

First, as a first example of how $W_{GAIN}$ is set in the second embodiment, a sixth example of setting will be described. Suppose now that the W pixel $W_{14}$ is defective (non-luminous), and assume that the standard conversion rate is set at 90%. In this case, based on the defect information that identifies the position of the defective W pixel $W_{14}$, the RGB-RGBW conversion circuit 1 sets the W pixel use rate (the RGB-signals-to-W-signal conversion rate) $W_{GAIN}$ for $W_{12}$ and $W_{16}$ adjacently above and below the defective pixel at 100% as shown in FIG. 19; it sets $W_{GAIN}$ for all the unit pixels other than $W_{12}$ and $W_{16}$ equal to the standard conversion rate, namely 90%. This makes the brightness of $W_{12}$ and $W_{16}$ adjacently above and below the defective pixel comparatively high, compensating for the defect in $W_{14}$ and making it less conspicuous.

Though different from what is shown in FIG. 19, it is also possible to set $W_{GAIN}$ for only one (for example, in the sixth example of setting, $W_{12}$) of the W pixels adjacent to the defective pixel higher than the standard conversion rate.

As a modification, an adder (unillustrated) may be inserted between the multiplier 22 and the D/A conversion circuit 2 so that a predetermined offset is added to the output from the multiplier 22 corresponding to $W_{12}$ ($W_{16}$) adjacent to the defective pixel and the result is eventually used as the W signal Wout corresponding to $W_{12}$ ($W_{16}$). This helps further increase the brightness of $W_{12}$ ($W_{16}$) and thereby make the defect in the W pixel less conspicuous. Instead of such an adder, a multiplier (unillustrated) may be used so that the output from the multiplier 22 corresponding to $W_{12}$ ($W_{16}$) adjacent to the defective pixel is multiplied by a predetermined value greater than one (for example, 1.1) and the result is eventually used as the W signal Wout corresponding to $W_{12}$ ($W_{16}$).

Next, a seventh example of setting will be described. Suppose now that the W pixel $W_{14}$ is defective (non-luminous), and assume that the standard conversion rate is set at 90% (it may be set at 100%). In this case, based on the defect information that identifies the position of the defective W pixel $W_{14}$, the RGB-RGBW conversion circuit 1 sets the W pixel use rate (the RGB-signals-to-W-signal conversion rate) $W_{GAIN}$ for $G_{13}$ and $R_{14}$ adjacently to the left and right of the defective pixel at 80% as shown in FIG. 20; it sets $W_{GAIN}$ for all the unit pixels other than $G_{13}$ and $R_{14}$ equal to the standard conversion rate, namely 90%. This makes the brightness of $G_{13}$ and $R_{14}$ adjacently to the left and right of the defective pixel comparatively high, compensating for the defect in $W_{14}$ and making it less conspicuous.

In this way, in a case where a W pixel is defective, $W_{GAIN}$ for the non-W unit pixels (in the seventh example of setting, G and R pixels) adjacent to the defective pixel is set lower than the standard conversion rate set over the entire display panel. Here, $W_{GAIN}$ may be set lower than the standard conversion rate only for one (for example, in the seventh example of setting, the G pixel $G_{13}$) of the unit pixels adjacent to the defective pixel.

As a modification, an adder (unillustrated) may be inserted between the subtracter 24R (24G) and the D/A conversion circuit 2 so that a predetermined offset is added to the output from the subtracter 24R (24G) corresponding to $R_{14}$ ($G_{13}$) adjacent to the defective pixel and the result is eventually used as the R signal Rout (G signal Gout) corresponding to $R_{14}$ ($G_{13}$). This helps further increase the brightness of $R_{14}$ ($G_{13}$) and thereby make the defect in the W pixel less conspicuous. Instead of such an adder, a multiplier (unillustrated) may be used so that the output from the subtracter 24R (24G) corresponding to $R_{14}$ ($G_{13}$) adjacent to the defective pixel is multiplied by a predetermined value greater than one (for example, 1.1) and the result is eventually used as the R signal Rout (G signal Gout) corresponding to $R_{14}$ ($G_{13}$).

Next, an eighth example of setting will be described. Suppose now that the W pixel $W_{14}$ is defective (non-luminous), and assume that the standard conversion rate is set at the maximum value, namely 100%. In this case, based on the defect information that identifies the position of the defective W pixel $W_{14}$, the RGB-RGBW conversion circuit 1 sets the W pixel use rate (the RGB-signals-to-W-signal conversion rate) $W_{GAIN}$ for $G_{11}$, $R_{12}$, $B_{13}$, $G_{13}$, $R_{14}$, $B_{14}$, $G_{15}$, and $R_{16}$ at 90%, 90%, 50%, 20%, 20%, 50%, 90%, and 90%, respectively, as shown in FIG. 21; it sets $W_{GAIN}$ for all the other unit pixels, including $W_{12}$ and $W_{19}$, equal to the standard conversion rate, namely 100%.

Thus, in the horizontal direction, the smaller the distance from the defective pixel, the lower $W_{GAIN}$ is set. Also in the oblique directions, the smaller the distance from the defective pixel, the lower $W_{GAIN}$ is set. Hence, for example, when white is displayed, brightness gradually increases as one approaches the defective pixel in the horizontal and oblique directions. While the defect in $W_{14}$ is compensated for with the increased brightness in the pixels around $W_{14}$, their brightness is increased gradually in different directions. This helps make the defect in $W_{14}$ less conspicuous. This eighth example of setting is particularly effective in a case where the standard conversion rate is set at its maximum value, namely 100%.

As a modification, an adder (unillustrated) may be inserted between the subtracter 24R (24G) and the D/A conversion circuit 2 so that a predetermined offset is added to the output from the subtracter 24R (24G) corresponding to $R_{14}$ ($G_{13}$, $R_{12}$, $G_{11}$, $R_{16}$, and/or $G_{15}$) and the result is eventually used as the R signal Rout (G signal Gout) corresponding to $R_{14}$ ($G_{13}$, $R_{12}$, $G_{11}$, $R_{16}$, and/or $G_{15}$). This helps further increase the brightness of $R_{14}$ ($G_{13}$, $R_{12}$, $G_{11}$, $R_{6}$, and/or $G_{15}$) and thereby make the defect in the W pixel less conspicuous. Instead of such an adder, a multiplier (unillustrated) may be used so that the output from the subtracter 24R (24G) corresponding to $R_{14}$ ($G_{13}$, $R_{12}$, $G_{11}$, $R_{16}$, and/or $G_{15}$) adjacent to the defective pixel is multiplied by a predetermined value greater than one (for example, 1.1) and the result is eventually used as the R signal Rout (G signal Gout) corresponding to $R_{14}$ ($G_{13}$, $R_{12}$, $G_{11}$, $R_{16}$, and/or $G_{15}$).

In the first to eighth examples of setting, $W_{GAIN}$ for the defective pixel is, for example, fixed (for example, at 0% or equal to the standard conversion rate).

Panel Adjustment

Next, the panel adjustment performed when the organic EL display devices of the first and second embodiments are fabricated will be described. Through this panel adjustment, the values (that is, the individual values of $\alpha_R$, $\alpha_G$, and $\alpha_B$) are determined that set the ratio "$\alpha R$:$\alpha_G$:$\alpha_B$" in which RGB input signals are converted into a W signal. The determined values (the individual values of $\alpha_R$, $\alpha_G$, and $\alpha_B$) are stored, for example, in an unillustrated memory incorporated in the RGB-RGBW conversion circuit 1, and are used to calculate the RGBW signals Rout, Gout, Bout, and Wout that have been described.

Figure 22:
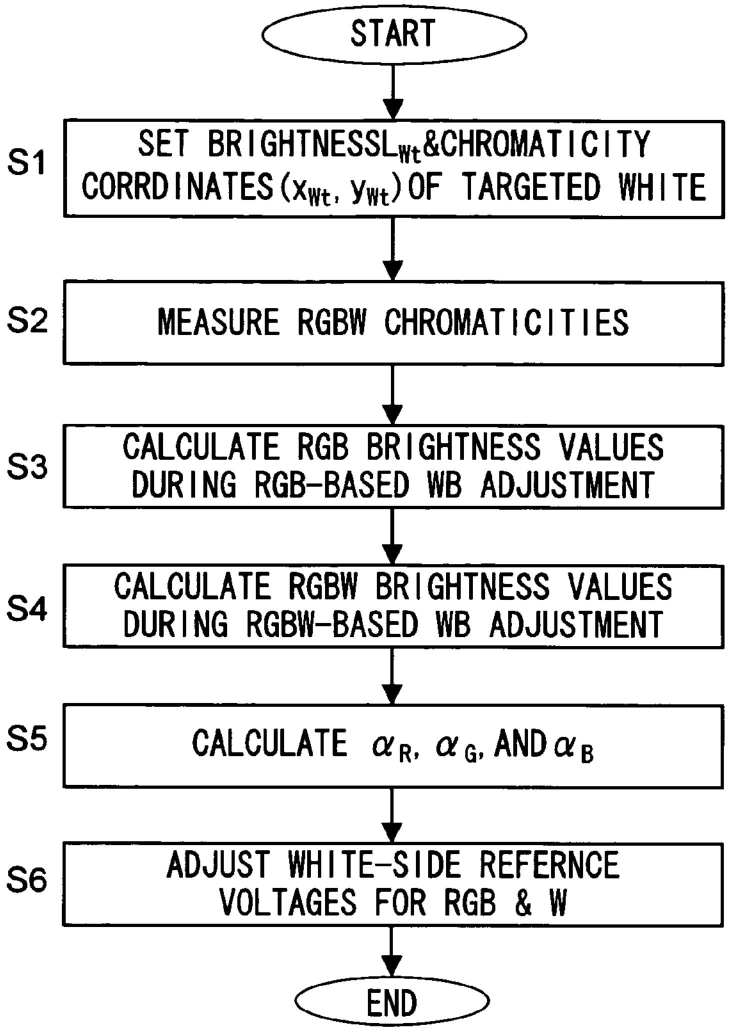
FIG. 22 is a diagram illustrating the procedure by which the display panel is adjusted in the organic EL display devices of the first and second embodiments.

FIG. 22 is a flow chart showing the procedure of the panel adjustment. First, in step S1, "the brightness $L_{Wt}$ and the chromaticity coordinates ($x_{Wt}$, $y_{Wt}$)" of the targeted white $W_t$(255) are set. The targeted white $W_t$ denotes the white that is intended to be displayed when the RGB input signals are equal (that is, Rin=Gin=Bin), and thus the targeted white $W_t$(255) denotes the white that is intended to be displayed when the RGB input signals are all 255 (that is, Rin=Gin=Bin=255).

The chromaticity coordinates denote the coordinate components as observed in the xy chromaticity diagram. For example, the brightness $L_{Wt}$ is set at 200 cd/m$^2$ (candela per square meter), and the chromaticity coordinates ($x_{Wt}$, $Y_{Wt}$) are set at (0.32, 0.33).

Next, the chromaticities of the R, G, B, and W pixels provided in the display panel 3 or 3*a* are measured (step S2). For example, to measure the chromaticity of the R pixels, they alone are lit, and their chromaticity is measured with a light tester (unillustrated). Let the thus measured chromaticity coordinates of the R, G, B, and W pixels be ($x_R$, $y_R$), ($x_G$, $y_G$), ($x_B$, $y_B$), and ($x_W$, $y_W$), respectively.

Figure 23:
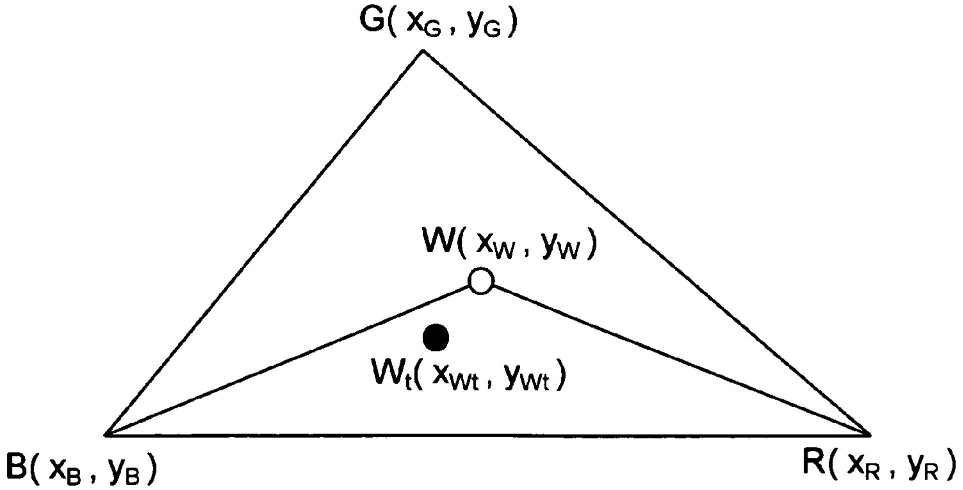
FIG. 23 is a diagram showing the relationship between the chromaticities of the RGBW pixels shown in FIGS. 7 and 18 and the chromaticity of the targeted white.
Figure 24:
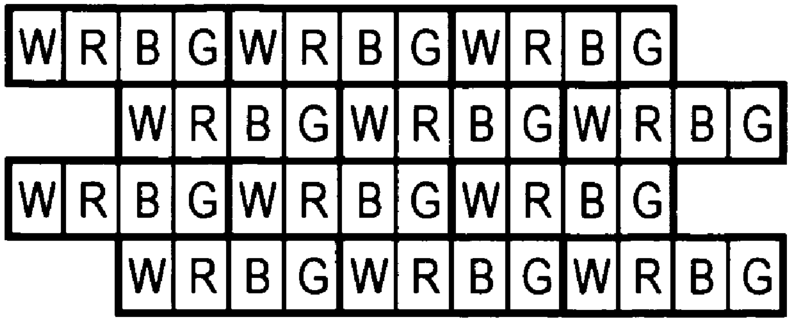
FIG.24 PRIOR ART
FIG. 24 is a diagram showing the array of unit pixels in a conventional RGBW-type display panel (organic EL display panel)
Figure 25:
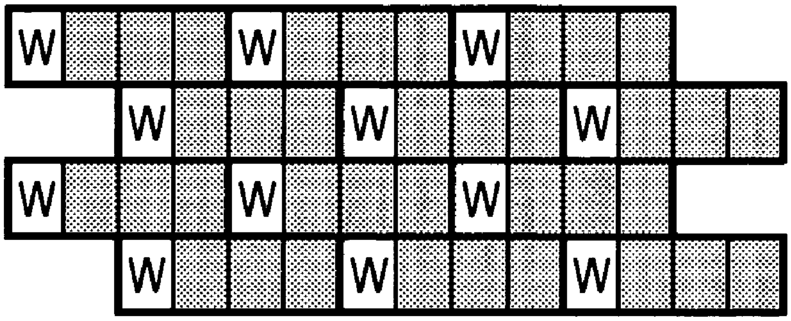
FIG.25 PRIOR ART
FIG. 25 is a diagram showing a state of the display panel shown in FIG. 24, when displaying white.
Figure 26:
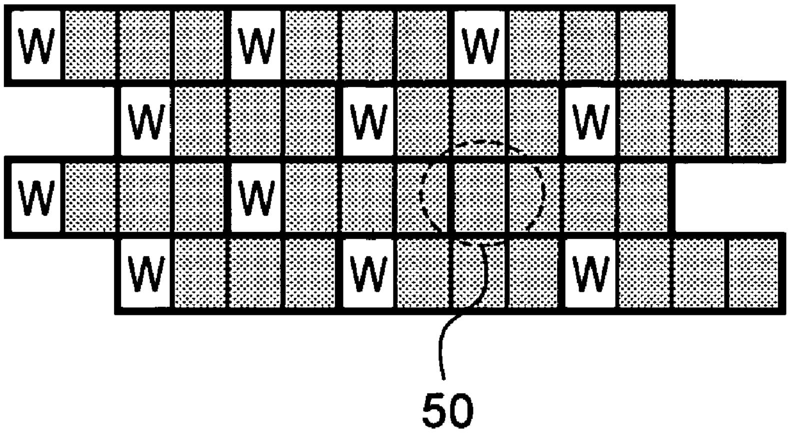
FIG.26 PRIOR ART
FIG. 26 is a diagram showing a state of the display panel shown in FIG. 24, when displaying white with one white displaying unit pixel defective.
Figure 27A:
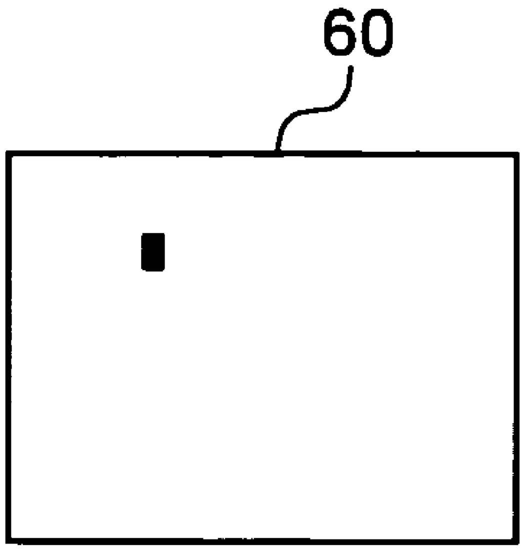
FIG.27A PRIOR ART
FIGS. 27A and 27B are diagrams illustrating the benefit achieved by the present invention.
Figure 27B:
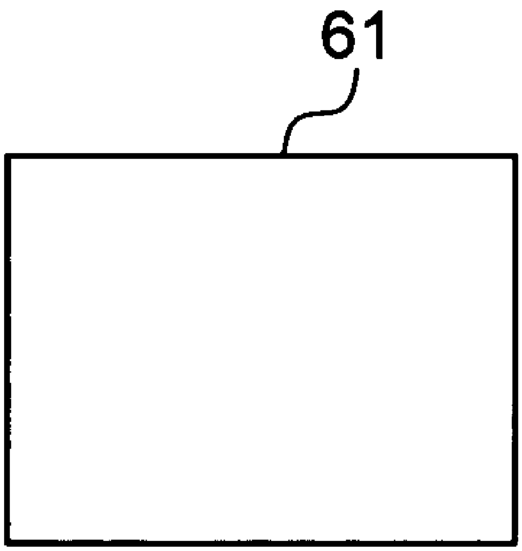

FIG. 23 is a diagram showing an example of the relationship between the chromaticity coordinates of the R, G, B, and W pixels and the chromaticity coordinates of the targeted white $W_t$. As shown in FIG. 23, the chromaticity obtained when the W pixels are lit usually does not agree with the chromaticity of the targeted white. The chromaticity coordinates ($x_W$, $y_W$) obtained when the W pixels are lit are designed to be located, in the chromaticity coordinate system, inside the triangle formed by the chromaticity coordinates ($x_R$, $y_R$) of the R pixels, the chromaticity coordinates ($x_G$, $y_G$) of the G pixels, and the chromaticity coordinates ($x_B$, $y_B$) of the B pixels. Moreover, the chromaticity of the targeted white $W_t$ is designed to be located inside that triangle. For example, ($x_R$, $y_R$), ($x_G$, $y_G$), ($x_B$, $y_B$), and ($x_W$, $y_W$) are (0.63, 0.36), (0.31, 0.61), (0.14, 0.16), and (0.29, 0.33).

Next, the RGB brightness values obtained when white balance (WB) is adjusted on an RGB basis are calculated (step S3). That is, the R pixel brightness value (let this be $L_{R1}$), the G pixel brightness value (let this be $L_{G1}$), and the B pixel brightness value (let this be $L_{B1}$) that achieve "the brightness $L_{Wt}$ and the chromaticity coordinates ($x_{Wt}$, $y_{Wt}$)" of the targeted white $W_t$(255) when the pixels of three colors, namely R, G, and B pixels, alone are lit are calculated. These brightness values $L_{R1}$, $L_{G1}$, and $L_{B1}$ are calculated by matrix formula (16) noted below.

$$\begin{pmatrix} \frac{x_R}{y_R} & \frac{x_G}{y_G} & \frac{x_B}{y_B} \\ 1.0 & 1.0 & 1.0 \\ \frac{z_R}{y_R} & \frac{z_G}{y_G} & \frac{z_B}{y_B} \end{pmatrix} \begin{pmatrix} L_{R1} \\ L_{G1} \\ L_{B1} \end{pmatrix} = \begin{pmatrix} \frac{x_{Wt}}{y_{Wt}} L_{Wt} \\ L_{Wt} \\ \frac{z_{Wt}}{y_{Wt}} L_{Wt} \end{pmatrix} \tag{16}$$

In formula (16) noted above, $z_R=1-x_R-y_R$, $z_G=1-x_G-y_G$, $z_B=1-x_B-y_B$, and $z_{Wt}=1-x_{Wt}-y_{Wt}$.

Next, the RGBW brightness values obtained when white balance (WB) is adjusted on an RGBW basis are calculated (step S4). That is, the R pixel brightness value (let this be $L_{R2}$), the G pixel brightness value (let this be $L_{G2}$), the B pixel brightness value (let this be $L_{B2}$), and the W pixel brightness value (let this be $L_{W2}$) that achieve "the brightness $L_{Wt}$ and the chromaticity coordinates ($x_{Wt}$, $y_{Wt}$)" of the targeted white $W_t$(255) when the pixels of four colors, namely R, G, B, and W, are all lit are calculated.

The chromaticity coordinates of the targeted white $W_t$ are located "inside the triangle (or on any of the sides thereof) formed by the chromaticity coordinates of the R, B, and W pixels", or "inside the triangle (or on any of the sides thereof) formed by the chromaticity coordinates of the G, R, and W pixels", or "inside the triangle (or on any of the sides thereof) formed by the chromaticity coordinates of the B, G, and W pixels". Thus, the chromaticity of the targeted white $W_t$ can be obtained by lighting the pixels of three colors, including the W pixels.

For example, in a case where, as shown in FIG. 23, the chromaticity coordinates of the targeted white $W_t$ are located "inside the triangle formed by the chromaticity coordinates of the R, B, and W pixels", the chromaticity of the targeted white $W_t$ can be obtained by lighting the pixels of three colors, namely R, B, and W. In this case, the brightness values $L_{R2}$, $L_{B2}$, and $L_{W2}$ are calculated by matrix formula (17) noted below, and the brightness value $L_{G2}$ equals 0.

$$\begin{pmatrix} \frac{x_R}{y_R} & \frac{x_W}{y_W} & \frac{x_B}{y_B} \\ 1.0 & 1.0 & 1.0 \\ \frac{z_R}{y_R} & \frac{z_W}{y_W} & \frac{z_B}{y_B} \end{pmatrix} \begin{pmatrix} L_{R2} \\ L_{W2} \\ L_{B2} \end{pmatrix} = \begin{pmatrix} \frac{x_{Wt}}{y_{Wt}} L_{Wt} \\ L_{Wt} \\ \frac{z_{Wt}}{y_{Wt}} L_{Wt} \end{pmatrix} \tag{17}$$

In formula (17) noted above, $z_R=1-x_R-y_R$, $z_W=1-x_W-y_W$, $z_B=1-x_B-y_B$, and $z_{Wt}=1-x_{Wt}-y_{Wt}$.

Then, based on the brightness values $L_{R1}$ etc. calculated in steps S3 and S4, the values of $\alpha_R$, $\alpha_G$, and $\alpha_B$ that set the ratio in which RGB input signals are converted into a W signal are calculated by formulae (18), (19), and (20) noted below (step S5).

$$\alpha_R=1/(1-LR2/LR1) \tag{18}$$

$$\alpha_G=1/(1-LG2/LG1) \tag{19}$$

$$\alpha_B=1/(1-LB2/LB1) \tag{20}$$

The D/A conversion circuit 2 also receives a "reference voltage for R", a "reference voltage for G", a "reference voltage for B" (these are referred to collectively as the "reference voltages for RGB"), and a "reference voltage for W". With reference to these reference voltages for RGB and for W, the D/A conversion circuit 2 feeds RGBW signals in the form of analog voltages to the individual unit pixels provided in the display panel 3 or 3*a*. The brightness of each unit pixel varies according to the analog voltage fed thereto.

In step S6, the reference voltages (reference brightness) for RGB are so adjusted that, when RGBW signals having values (Rout, Gout, Bout, Wout)=(255, 255, 255, 0) are fed, the brightness and the chromaticity coordinates of the light emitted by the display panel 3 or 3*a* equal "the brightness $L_{Wt}$ and the chromaticity coordinates ($x_{Wt}$, $y_{Wt}$)" of the targeted white $W_t$ (255), respectively. The reference voltages are adjusted individually for each type of pixel. That is, the "reference voltage for R" is so adjusted that, when RGBW signals having values (Rout, Gout, Bout, Wout)=(255, 0, 0, 0) are fed to the D/A conversion circuit 2, the brightness value of the R pixels equals the brightness value $L_{R1}$ calculated in step S3; the "reference voltage for G") is so adjusted that, when RGBW signals having values (Rout, Gout, Bout, Wout)=(0, 255, 0, 0) are fed to the D/A conversion circuit 2, the brightness value of the G pixels equals the brightness value $L_{G1}$ calculated in step S3; the "reference voltage for B" is so adjusted that, when RGBW signals having values (Rout, Gout, Bout, Wout)=(0, 0, 255, 0) are fed to the D/A conversion circuit 2, the brightness value of the B pixels equals the brightness value $L_{B1}$ calculated in step S3. Once the reference voltages for RGB are adjusted in this way, the chromaticity of the light emitted by the display panel 3 or 3*a* when RGB input signals are all equal (that is, Rin=Gin=Bin) always equals the chromaticity of the targeted white $W_t$.

On the other hand, the reference voltage (reference brightness) for W is so adjusted that, when RGBW signals having values (Rout, Gout, Bout, Wout)=(0, 0, 0, 255) are fed to the D/A conversion circuit 2 to light the W pixels alone, their brightness equals the brightness value $L_{W2}$ calculated in step S4 (step S6). Incidentally, the RGBW signals (for example, having values (Rout, Gout, Bout, Wout)=(0, 0, 0, 255)) that need to be fed to the D/A conversion circuit 2 to perform the above-described panel adjustment are produced by a test circuit (unillustrated in FIGS. 1, 6, 17, etc.). The test circuit can produce RGBW signals having arbitrary values, and is inserted between the RGB-RGBW conversion circuit 1 and the D/A conversion circuit 2.

MODIFICATIONS AND VARIATIONS

It should be understood that the present invention is applicable to display devices of any types other than organic EL display device specifically dealt with in the embodiments described above; that is, the present invention is applicable to various display devices including, among others, inorganic EL display devices provided with inorganic EL display panels as display panels, liquid crystal display devices provided with liquid crystal display panels as display panels, and plasma displays.

The unit pixels that are provided separately from R, G, and B pixels are not limited to W pixels. Let "X" represent any color other than RGB (red, blue, and green), and every occurrence of "W" in the description hereinbefore may be replaced with "X". That is, the present invention is applicable to various display devices provided with RGBX-type display panels.

It should also be understood that all the specific values given in the description hereinbefore are meant merely to give examples, and thus are not meant to limit in any way the manner the present invention is practiced.

The present invention is suitable for various display devices such as liquid crystal display devices and plasma display devices. The present invention is especially suitable for display devices provided with self-luminous display panels such as organic EL display panels, inorganic EL display panels, and PDPs (plasma display panels).

What is claimed is:

1. A display device comprising:

an RGB-RGBX conversion circuit that converts RGB signals fed thereto into RGBX signals, where X represents a predetermined color other than R, G, and B;

a display panel that displays an image based on the RGBX signals obtained from the RGB-RGBX conversion circuit, the display panel being composed of a plurality of dots each composed of four unit pixels that are an R pixel, a G pixel, a B pixel, and an X pixel;

a defect position specifier that specifies, if a unit pixel is found defective, a position of the defective pixel on the display panel;

the RGB-RGBX conversion circuit having a conversion rate controller that controls a conversion rate at which, when the RGB signals are converted into the RGBX signals, the RGB signals are converted into an X signal according to the position specified by the defect position specifier;

the conversion rate controller makes the conversion rate for at least one unit pixel adjacent to the defective pixel different from a standard conversion rate set for the entire display panel.

2. The display device of claim 1, wherein the RGB signals fed to the RGB-RGBX conversion circuit are composed of an R signal representing brightness of R pixels, a G signal representing brightness of G pixels, and a B signal representing brightness of B pixels; and let a maximum value of the X signal obtained when the RGB signals fed to the RGB-RGBX conversion circuit are converted into the RGBX signals be called a maximum-conversion X signal value, and let a component of an R signal, a component of a G signal, and a component of a B signal that are to be converted into the maximum-conversion X signal value be called a maximum-conversion R signal, a maximum-conversion G signal, and a maximum-conversion B signal, respectively, then the conversion rate controlled by the conversion rate controller represents a ratio of the component of the R signal actually converted into the X signal to the maximum-conversion R signal, a ratio of the component of the G signal actually converted into the X signal to the maximum-conversion G signal, and a ratio of the component of the B signal actually converted into the X signal to the maximum-conversion B signal.

3. The display device of claim 2, wherein if the defective pixel is an X pixel, the conversion rate controller makes the conversion rate for at least one non-X unit pixel adjacent to the defective pixel lower than the standard conversion rate.

4. The display device of claim 2, wherein if the defective pixel is an X pixel, the conversion rate controller makes the conversion rate for the R, G, and B pixels of a dot including at least one unit pixel adjacent to the defective pixel lower than the standard conversion rate.

5. The display device of claim 2, wherein if the defective pixel is an R, G, or B pixel, the conversion rate controller makes the conversion rate for at least one non-X unit pixel adjacent to the defective pixel lower than the standard conversion rate.

6. The display device of claim 2, wherein if the defective pixel is an R, G, or B pixel, and in addition one or more X pixels are adjacent to the defective pixel, the conversion rate controller makes the conversion rate for at least one of the one or more X pixels adjacent to the defective pixel higher than the standard conversion rate.

7. The display device of claim 2, wherein if the defective pixel is an X pixel, and in addition one or more other X pixels are adjacent to the defective pixel, the conversion rate controller makes the conversion rate for at least one X pixel adjacent to the defective pixel higher than the standard conversion rate.

8. The display device of claim 2, wherein if the defective pixel is an X pixel, and in addition one or more other X pixels are adjacent to the defective pixel, the conversion rate controller makes the conversion rate for at least one non-X unit pixel adjacent to the defective pixel lower than the standard conversion rate.

9. The display device of claim 2, wherein if the defective pixel is an X pixel, in addition one or more other X pixels are adjacent to the defective pixel, and in addition the conversion rate for the other X pixels adjacent to the defective pixel is maximal, the conversion rate controller makes the conversion rate for at least one non-X unit pixel adjacent to the defective pixel lower than the standard conversion rate, and makes the conversion rate for at least one non-X unit pixel adjacent to the other X pixels lower than the standard conversion rate.

10. The display device of claim 1, wherein chromaticity coordinates of a chromaticity obtained as a result of light emission by an X pixel are located, in a chromaticity coordinate system, inside a triangle formed by chromaticity coordinates of an R pixel, chromaticity coordinates of a G pixel, and chromaticity coordinates of a B pixel.

11. The display device of claim 1, wherein the standard conversion rate is a conversion rate set for all the unit pixels when none of all the unit pixels forming the display panel is found defective.

12. The display device of claim 1, wherein if the defective pixel is an X pixel, the conversion rate controller makes the conversion rate for at least one non-X unit pixel adjacent to the defective pixel lower than the standard conversion rate.

13. The display device of claim 1, wherein if the defective pixel is an X pixel, the conversion rate controller makes the conversion rate for the R, G, and B pixels of a dot including at least one unit pixel adjacent to the defective pixel lower than the standard conversion rate.

14. The display device of claim 1, wherein if the defective pixel is an R, G, or B pixel, the conversion rate controller makes the conversion rate for at least one non-X unit pixel adjacent to the defective pixel lower than the standard conversion rate.

15. The display device of claim 1, wherein if the defective pixel is an R, G, or B pixel, and in addition one or more X pixels are adjacent to the defective pixel, the conversion rate controller makes the conversion rate for at least one of the one or more X pixels adjacent to the defective pixel higher than the standard conversion rate.

16. The display device of claim 1, wherein if the defective pixel is an X pixel, and in addition one or more other X pixels are adjacent to the defective pixel, the conversion rate controller makes the conversion rate for at least one X pixel adjacent to the defective pixel higher than the standard conversion rate.

17. The display device of claim 1, wherein if the defective pixel is an X pixel, and in addition one or more other X pixels are adjacent to the defective pixel, the conversion rate controller makes the conversion rate for at least one non-X unit pixel adjacent to the defective pixel lower than the standard conversion rate.

18. The display device of claim 1, wherein if the defective pixel is an X pixel, in addition one or more other X pixels are adjacent to the defective pixel, and in addition the conversion rate for the other X pixels adjacent to the defective pixel is maximal, the conversion rate controller makes the conversion rate for at least one non-X unit pixel adjacent to the defective pixel lower than the standard conversion rate, and makes the conversion rate for at least one non-X unit pixel adjacent to the other X pixels lower than the standard conversion rate.

* * * * *